(12) United States Patent
Chen et al.

(10) Patent No.: US 10,007,852 B2
(45) Date of Patent: Jun. 26, 2018

(54) METHODS AND APPARATUSES FOR PERFORMING OBJECT TRACKING USING GRAPHS

(71) Applicants: Lingji Chen, Acton, MA (US); Balasubramaniam Ravichandran, Winchester, MA (US)

(72) Inventors: Lingji Chen, Acton, MA (US); Balasubramaniam Ravichandran, Winchester, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 198 days.

(21) Appl. No.: 15/166,791

(22) Filed: May 27, 2016

(65) Prior Publication Data

US 2017/0213089 A1 Jul. 27, 2017

Related U.S. Application Data

(60) Provisional application No. 62/168,168, filed on May 29, 2015.

(51) Int. Cl.
*G06K 9/00* (2006.01)
*G06T 7/246* (2017.01)

(52) U.S. Cl.
CPC ..... *G06K 9/00771* (2013.01); *G06K 9/00664* (2013.01); *G06T 7/246* (2017.01); *G06T 2207/30241* (2013.01)

(58) Field of Classification Search
CPC .................................................. G06K 9/00771
See application file for complete search history.

(56) References Cited

U.S. PATENT DOCUMENTS

| | | | | |
|---|---|---|---|---|
| 5,796,621 A | * | 8/1998 | Dudley | G06F 17/5031 716/103 |
| 8,615,107 B2 | * | 12/2013 | Fleuret | G06T 7/20 382/103 |
| 8,666,164 B2 | * | 3/2014 | Thangam | G06K 9/469 382/171 |
| 9,521,988 B2 | * | 12/2016 | Zhang | A61B 6/547 |
| 9,582,718 B1 | * | 2/2017 | Carr | G06K 9/00624 |

(Continued)

OTHER PUBLICATIONS

Jerrum M., Sinclair A., "The Markov Chain Monte Carlo Method: An Approach to Approximate Counting and Integration", Approximation Algorithms for NP-hard Problems,1996, PWS Publishing Co., pp. 482-520.

(Continued)

*Primary Examiner* — James Pontius
(74) *Attorney, Agent, or Firm* — Scully Scott Murphy & Presser PC; Scott J. Asmus

(57) ABSTRACT

Solutions for object tracking problems are presented by gathering images using one or more cameras, processing the gathered images to generate a directed acyclic graph, using the directed acyclic graph to determine a path cover that achieves maximum weight and satisfies one or more positive or negative constraints, and using the path cover to solve the object tracking problem. A first set of solutions utilizes trellis graphs, a second set of solutions employs a greedy approach, and a third set of solutions uses search algorithms.

24 Claims, 20 Drawing Sheets

(56) References Cited

U.S. PATENT DOCUMENTS

| | | | | |
|---|---|---|---|---|
| 2007/0237357 | A1* | 10/2007 | Low | G01S 3/781 |
| | | | | 382/103 |
| 2008/0249895 | A1* | 10/2008 | Mariotti | G06Q 10/02 |
| | | | | 705/5 |
| 2011/0060750 | A1* | 3/2011 | Kuhn | G06F 17/30961 |
| | | | | 707/758 |
| 2013/0177200 | A1* | 7/2013 | Fleuret | G06T 7/20 |
| | | | | 382/103 |
| 2013/0242284 | A1* | 9/2013 | Zeng | G01S 17/66 |
| | | | | 356/4.01 |
| 2016/0212024 | A1* | 7/2016 | Abou Mahmoud | H04L 43/045 |
| 2016/0235388 | A1* | 8/2016 | Zhang | A61B 6/547 |

OTHER PUBLICATIONS

Gomila. et al., "Graph-Based Object Tracking" ICIP 2003, International Conference, IEEE, Sep. 2003, pp. 1-4.

Chen, L. and Ravichandran, R., A Maximum Weight Constrained Path Cover Algorithm for Graph-Based Multitarget Tracking, 18th International Conference on Information Fusion, Washington, D.C., Jul. 6-9, 2015.

\* cited by examiner

METHODS AND APPARATUSES FOR PERFORMING OBJECT TRACKING USING GRAPHS

STATEMENT OF GOVERNMENT INTEREST

This invention was made with United States Government support under Contract No. HQ0034-12-C-0050 awarded by the Department of Defense. The United States Government has certain rights in this invention.

BACKGROUND

1. Field

The system and method relates to object tracking and, more particularly, to methods and apparatuses for performing object tracking by solving graph problems.

2. Brief Description

Object tracking, also referred to as video tracking, may be defined as tracking one or more objects across a sequence of video images gathered by one or more cameras. A wide variety of practical applications exist for object tracking, some of which include human-computer interaction, security and surveillance, national defense, video communication and compression, augmented reality, traffic control, medical imaging, and video editing. In general, tracking objects is a challenging problem. Difficulties in tracking objects can arise due to abrupt object motion, changing appearance patterns of both the object and the scene, nonrigid or changing object structures, object-to-object and object-to-scene occlusions, and camera motion. Likewise, object tracking may be a time consuming process due to the amount of data that is contained in the gathered images. Higher-level applications are often utilized in connection with object tracking, and some of these applications require a determination of the location and/or the shape of a target object for every image frame. Adding further to the complexity is the possible need to use object recognition techniques for tracking, a challenging problem in its own right.

One aspect of object tracking is to associate a target object that appears in a series of consecutive video frames. To perform this association, sequential image frames are analyzed to generate an output representing movements of a target object between the frames. The association can be especially difficult when the target object, as well as other objects, are moving fast relative to a rate at which the image frames are gathered. Another situation that increases the complexity of the problem is when the tracked object changes orientation over time. For these situations, object tracking systems may employ a motion model which describes how the image of the target might change for different possible motions of the object.

Multiple Hypothesis Tracking (MHT) is one of the earliest useful method for performing object tracking. MHT builds a tree of potential track hypotheses for each candidate target object, thereby providing a systematic solution to data association problems. A likelihood of each track is calculated, and a most likely combination of tracks is selected. MHT is ideally suited to exploiting higher-order information such as long-terra motion and appearance models, since the entire track hypothesis can be considered when computing the likelihood of each track.

In a typical, track-oriented MHT implementation, a tree/forest data structure is utilized. As measurements come in, new leaf nodes are created and incorporated to represent possible track hypotheses. A best global solution in the form of a set of compatible track hypotheses with the best association likelihood is then obtained by solving a linear integer programming problem. The width of the tree can grow exponentially with the number of measurements in such an approach, and thus pruning becomes a crucial part of MHT.

SUMMARY

A computer-implemented method for solving an object tracking problem may, in one aspect, comprise gathering, with one or more cameras, a sequence of image frames of one or more objects from a scene; processing, with one or more processors, the gathered sequence of image frames to construct a directed acyclic graph from the one or more objects in the sequence of image frames, the directed acyclic graph comprising a plurality of vertices each connected by one or more arcs, wherein each respective vertex of the plurality of vertices corresponds to an object of the one or more objects in an image frame of the sequence of image frames; implementing a single positive constraint by identifying a pair of vertices of the plurality of vertices as being on an identical path; identifying a longest path between the pair of vertices; deleting all vertices on the longest path from the directed acyclic graph, and deleting all incident arcs associated with the deleted vertices from the directed acyclic graph, to generate a simplified directed acyclic graph; and solving the object tracking problem, with the one or more processors, by applying a maximum weight bipartite matching procedure to the simplified directed acyclic graph to determine a most likely track for each of the one or more objects in the sequence of image frames.

An apparatus for solving an object tracking problem, in another aspect, may comprise a processor and a memory operatively coupled to the processor, wherein the memory comprises instructions which, when executed by the processor, cause the processor to perform: receiving, from one or more cameras, a sequence of image frames of one or more objects from a scene; processing the received sequence of image frames to construct a directed acyclic graph from the one or more objects in the sequence of image frames, the directed acyclic graph comprising a plurality of vertices connected by one or more arcs, wherein each respective vertex of the plurality of vertices corresponds to an object of the one or more objects in an image frame of the sequence of image frames; implementing a single positive constraint by identifying a pair of vertices of the plurality of vertices as being on an identical path; identifying a longest path between the pair of vertices; deleting all vertices on the longest path from the directed acyclic graph, and deleting all incident arcs associated with the deleted vertices from the directed acyclic graph, to generate a simplified directed acyclic graph; and solving the object tracking problem by applying a maximum weight bipartite matching procedure to the simplified directed acyclic graph to determine a most likely track for each of the one or more objects in the sequence of image frames.

A computer-implemented method for solving an object tracking problem, in another aspect, may comprise gathering, with one or more cameras, a sequence of image frames of one or more objects from a scene; processing, with one or more processors, the gathered sequence of image frames to construct a trellis graph from the one or more objects in the sequence of image frames, the trellis graph comprising a plurality of vertices each connected by one or more arcs, wherein each respective vertex of the plurality of vertices corresponds to an object of the one or more objects in an image frame of the sequence of image frames; applying a single positive constraint to a first vertex and a second vertex of the plurality of vertices, wherein the first vertex and the second vertex are constrained to be a same-track pair included in an identical path; performing a forward sweep to identify a set of one or more vertices of the plurality of vertices in the trellis graph that are reachable from the first vertex; associating the identified set of one or more vertices with a first identifier; performing a backward sweep through the set of one or more vertices associated with the first identifier to identify a subset of vertices that reach the second vertex; constructing an auxiliary graph with the first vertex, the second vertex, and the subset of vertices that are associated with the second identifier, wherein the auxiliary graph includes a plurality of vertices and at least one respective arc associated with a corresponding first weight; and solving the object tracking problem, with the one or more processors, to determine a most likely track for each of the one or more objects in the sequence of image frames, by constructing a companion bipartite graph from the auxiliary graph by splitting each respective vertex of the plurality of vertices in the auxiliary graph, including the first vertex and the second vertex, into a corresponding first vertex portion connected to a corresponding second vertex portion, wherein each corresponding first vertex portion is connected to zero or more incoming arcs, and each corresponding second vertex portion is connected to zero or more outgoing arcs.

An apparatus for solving an object tracking problem, in another aspect, may comprise a processor and a memory coupled to the processor, wherein the memory comprises instructions which, when executed by the processor, cause the processor to perform: receiving, from one or more cameras, a sequence of image frames of one or more objects from a scene; processing the received sequence of image frames to construct a trellis graph from the one or more objects in the sequence of image frames, the trellis graph comprising a plurality of vertices each connected by one or more arcs, wherein each respective vertex of the plurality of vertices corresponds to an object of the one or more objects in an image frame of the sequence of image frames; applying a single positive constraint to a first vertex and a second vertex of the plurality of vertices, wherein the first vertex and the second vertex are constrained to be a same-track pair included in an identical path; performing a forward sweep to identify a set of one or more vertices of the plurality of vertices in the trellis graph that are reachable from the first vertex; associating the identified set of one or more vertices with a first identifier; performing a backward sweep through the set of one or more vertices associated with the first identifier to identify a subset of vertices that reach the second vertex; constructing an auxiliary graph with the first vertex, the second vertex, and the subset of vertices that are associated with the second identifier, wherein the auxiliary graph includes a plurality of vertices and at least one respective arc associated with a corresponding first weight; and solving the object tracking problem to determine a most likely track for each of the one or more objects in the sequence of image frames by constructing a companion bipartite graph from the auxiliary graph, wherein each respective vertex of the plurality of vertices in the auxiliary graph, including the first vertex and the second vertex, is split into a corresponding first vertex portion connected to a corresponding second vertex portion, wherein each corresponding first vertex portion is connected to zero or more incoming arcs, and wherein each corresponding second vertex portion is connected to zero or more outgoing arcs.

A computer-implemented method for solving an object tracking problem using a searching procedure, in another aspect, may comprise gathering, with one or more cameras, a sequence of image frames of one or more objects from a scene; processing, with one or more processors, the gathered sequence of image frames to construct a trellis graph from the one or more objects in the sequence of image frames, the trellis graph comprising a plurality of vertices each connected by one or more arcs, wherein each respective vertex of the plurality of vertices corresponds to an object of the one or more objects in an image frame of the sequence of image frames; the trellis graph including a plurality of temporally related stages including at least a first stage representing a first time window, a second stage representing a second time window, and a third stage representing a third time window, wherein the first stage is immediately adjacent to the second stage, and the third stage is not immediately adjacent to the first stage; analyzing the trellis graph, with the one or more processors, to identify each of one or more violating arcs that skip over the second stage from the first stage to the third stage, wherein the second stage comprises a skipped-over stage; for each respective arc of the one or more violating arcs, identifying a presence or an absence of the respective arc in an optimal solution comprising a corresponding configuration for the respective arc; for each corresponding configuration, constructing an auxiliary trellis graph by adding an auxiliary vertex and one or more auxiliary arcs for each of one or more skipped-over stage including the second stage; for each respective auxiliary arc of the one or more auxiliary arcs, assigning a corresponding weight to the respective auxiliary arc; and solving the object tracking problem, with the one or more processors, to determine a most likely track for each of the one or more objects in the sequence of image frames, by solving a maximum weight vertex-disjoint path cover problem for each of the auxiliary trellis graphs to formulate a set of solutions.

An apparatus for solving an object tracking problem using a searching procedure, in another aspect, may comprise a processor and a memory coupled to the processor, wherein the memory comprises instructions which, when executed by the processor, cause the processor to perform: receiving, from one or more cameras, a sequence of image frames of one or more objects from a scene; processing the received sequence of image frames to construct a trellis graph from the one or more objects in the sequence of image frames, the trellis graph comprising a plurality of vertices each connected by one or more arcs, wherein each respective vertex of the plurality of vertices corresponds to an object of the one or more objects in an image frame of the sequence of image frames; the trellis graph including a plurality of temporally related stages including at least a first stage representing a first time window, a second stage representing a second time window, and a third stage representing a third time window, wherein the first stage is immediately adjacent to the second stage, and the third stage is not immediately adjacent to the first stage; analyzing the trellis graph to identify each of one or more violating arcs that skip over the second stage from the first stage to the third stage, wherein the second stage comprises a skipped-over stage; for each respective arc of the one or more violating arcs, identifying a presence or an absence of the respective arc in an optimal solution comprising a corresponding configuration for the respective arc; for each corresponding configuration, constructing an auxiliary trellis graph by adding an auxiliary vertex and one or more auxiliary arcs for each of one or more skipped-over stage including the second stage; for each respective auxiliary arc of the one or more auxiliary arcs, assigning a corresponding weight to the respective auxiliary arc; and solving the object tracking problem to determine a most likely track for each of the one or more objects in the sequence of image frames by solving a maximum weight vertex-disjoint path cover problem for each of the auxiliary trellis graphs to formulate a set of solutions.

A computer-implemented method for solving an object tracking problem with a plurality of positive constraints, in another aspect, may comprise gathering, with one or more cameras, a sequence of image frames of one or more objects from a scene; processing, with one or more processors, the gathered sequence of image frames to construct a directed acyclic graph that includes a plurality of vertices; for each respective vertex of the plurality of vertices, the one or more processors assigning a level selected from a set of hierarchical levels based upon a length of a corresponding longest path from each respective vertex; the one or more processors determining a solution for connecting a first vertex of the plurality of vertices with a second vertex of the plurality of vertices, and also for connecting a third vertex of the plurality of vertices with a fourth vertex of the plurality of vertices, wherein the first and second vertices comprise a first set of vertices associated with a first indicia, and the third and fourth vertices comprise a second set of vertices associated with a second indicia; defining the first vertex as a starting vertex for the first indicia, and defining the third vertex as a starting vertex for the second indicia; defining the second vertex as a destination vertex for the first indicia, and defining the fourth vertex as a destination vertex for the second indicia; placing a marker associated with the first indicia on the first vertex, and placing a marker associated with the second indicia on the third vertex; alternately guiding the first marker and the second marker to move from one of the plurality of vertices to another of the plurality of vertices, wherein a marker situated at a vertex associated with a highest level moves first, followed next by any marker situated at a vertex associated with an intermediate level, and wherein a marker cannot land on a vertex already having a marker on it; the first marker traversing a first path between the starting vertex for the first indicia and the destination vertex for the first indicia, and the second marker traversing a second path between the starting vertex for the second indicia and the destination vertex for the second indicia, wherein the first and second paths are taken to be a set of paths for solving the object tracking problem.

An apparatus for solving an object tracking problem with a plurality of positive constraints, in another aspect, may comprise a processor and a memory coupled to the processor, wherein the memory comprises instructions which, when executed by the processor, cause the processor to perform: receiving a sequence of image frames of one or more objects gathered from a scene with one or more cameras; processing the received sequence of image frames to construct a directed acyclic graph that includes a plurality of vertices; for each respective vertex of the plurality of vertices, assigning a level selected from a set of hierarchical levels based upon a length of a corresponding longest path from each respective vertex; determining a solution for connecting a first vertex of the plurality of vertices with a second vertex of the plurality of vertices, and also for connecting a third vertex of the plurality of vertices with a fourth vertex of the plurality of vertices, wherein the first and second vertices comprise a first set of vertices associated with a first indicia, and the third and fourth vertices comprise a second set of vertices associated with a second indicia; defining the first vertex as a starting vertex for the first indicia, and defining the third vertex as a starting vertex for the second indicia; defining the second vertex as a destination vertex for the first indicia, and defining the fourth vertex as a destination vertex for the second indicia; placing a marker associated with the first indicia on the first vertex, and placing a marker associated with the second indicia on the third vertex; alternately guiding the first marker and the second marker to move from one of the plurality of vertices to another of the plurality of vertices, wherein a marker situated at a vertex associated with a highest level moves first, followed next by any marker situated at a vertex associated with an intermediate level, and wherein a marker cannot land on a vertex already having a marker on it; the first marker traversing a first path between the starting vertex for the first indicia and the destination vertex for the first indicia, and the second marker traversing a second path between the starting vertex for the second indicia and the destination vertex for the second indicia, wherein the first and second paths are taken to be a set of paths for solving the object tracking problem.

A computer-implemented method for solving an object tracking problem with a single negative constraint using a recursive search algorithm, in another aspect, may comprise gathering, with one or more cameras, a sequence of image frames of one or more objects from a scene; processing, with one or more processors, the gathered sequence of image frames to construct a directed acyclic graph that includes a plurality of vertices; defining an original bound associated with a first weight; identifying a pair of vertices from the directed acyclic graph that are associated with the single negative constraint; solving, with the one or more processors, an unconstrained problem for the directed acyclic graph to generate an unconstrained solution by ignoring the pair of vertices associated with the single negative constraint, the unconstrained solution providing the first weight; when the first weight is greater than the original bound, determining whether or not the unconstrained solution is valid; and when the unconstrained solution is valid, taking the unconstrained solution as a solution for the object tracking problem.

An apparatus for solving a tracking problem with a single negative constraint using a recursive search algorithm, in another aspect, may comprise a processor and a memory coupled to the processor, wherein the memory comprises instructions which, when executed by the processor, cause the processor to perform: receiving, from one or more cameras, a sequence of image frames of one or more objects from a scene; processing the gathered sequence of image frames to construct a directed acyclic graph that includes a plurality of vertices; defining an original bound associated with a first weight; identifying a pair of vertices from the directed acyclic graph that are associated with the single negative constraint; solving an unconstrained problem for the directed acyclic graph to generate an unconstrained solution by ignoring the pair of vertices associated with the single negative constraint, the unconstrained solution providing the first weight; when the first weight is greater than the original bound, determining whether or not the unconstrained solution is valid; and when the unconstrained solution is valid, taking the unconstrained solution as a solution for the object tracking problem.

A computer-implemented method for solving an object tracking problem with a single negative constraint using a trellis graph, in another aspect, may comprise: gathering, with one or more cameras, a sequence of image frames of one or more objects from a scene; processing, with one or more processors, the gathered sequence of image frames to construct the trellis graph as a union of subgraphs from a plurality of temporally related subgraph stages; obtaining an unconstrained maximum weight bipartite matching by applying each respective weight of a first set of weights to a corresponding subgraph in the union of subgraphs; formulating an optimal unconstrained path cover from the bipartite matching, wherein the unconstrained path cover includes a pair of vertices from the trellis graph that are associated with the single negative constraint; and when the single negative constraint is satisfied, taking the unconstrained path cover as a solution for the object tracking problem.

An apparatus for solving an object tracking problem with a single negative constraint, in another aspect, may comprise a processor and a memory coupled to the processor, wherein the memory comprises instructions which, when executed by the processor, cause the processor to perform: receiving, from one or more cameras, a sequence of image frames of one or more objects from a scene; processing the gathered sequence of image frames to construct a trellis graph that includes a plurality of vertices; representing the trellis graph as a union of subgraphs from a plurality of temporally related subgraph stages; obtaining an unconstrained maximum weight bipartite matching by applying each respective weight of a first set of weights to a corresponding subgraph in the union of subgraphs; formulating an optimal unconstrained path cover from the bipartite matching, wherein the unconstrained path cover includes a pair of vertices from the trellis graph that are associated with the single negative constraint; and when the single negative constraint is satisfied, taking the unconstrained path cover as a solution for the tracking problem.

BRIEF DESCRIPTION OF THE DRAWINGS

The invention is further described with respect to the accompanying drawings wherein.

DETAILED DESCRIPTION OF THE PREFERRED EMBODIMENTS

Due to inefficiencies that arise in the context of existing Multiple Hypothesis Tracking (MHT) methods, graph-based tracking (GBT) procedures represent a promising new approach for performing object tracking. Pursuant to GBT, one or more objects from a gathered image sequence are incorporated into a graph data structure. Graphs are mathematical structures used to model pairwise relations between objects. A graph is made up of vertices, nodes, or points which are connected by edges, arcs, or lines. A graph may be undirected, meaning that there is no distinction between the two vertices associated with each edge, or its edges may be directed from one vertex to another. Local computations, such as gating and likelihood, may be carried out and recorded in the graph. Hypotheses are not explicitly represented. A best global solution is obtained using suitable algorithms depending on the nature of the problem. Thus, data representation and inference are decoupled in GBT. The number of vertices grows linearly with the number of measurements, making GBT an attractive choice for handling large data sets.

A weighted directed acyclic graph (DAG) is a directed graph with nondirected cycles that is formed by a collection of vertices and directed edges. Each edge connects one vertex to another, such that there is no way to start at some vertex v and follow a sequence of edges that eventually loops back to v again. For purposes of illustration, a DAG may be used to represent a collection of tasks that need to be ordered into a sequence, subject to constraints that certain tasks must be performed earlier than others. In this example, vertices are used to represent tasks, and edges are used to represent constraints. However, in the present context of GBT, vertices represent measurements and/or tracklets for one or more objects, whereas edges represent allowable associations. Thus, a solution with a set of tracks is simply a vertex-disjoint path cover of the graph.

Figure 1:
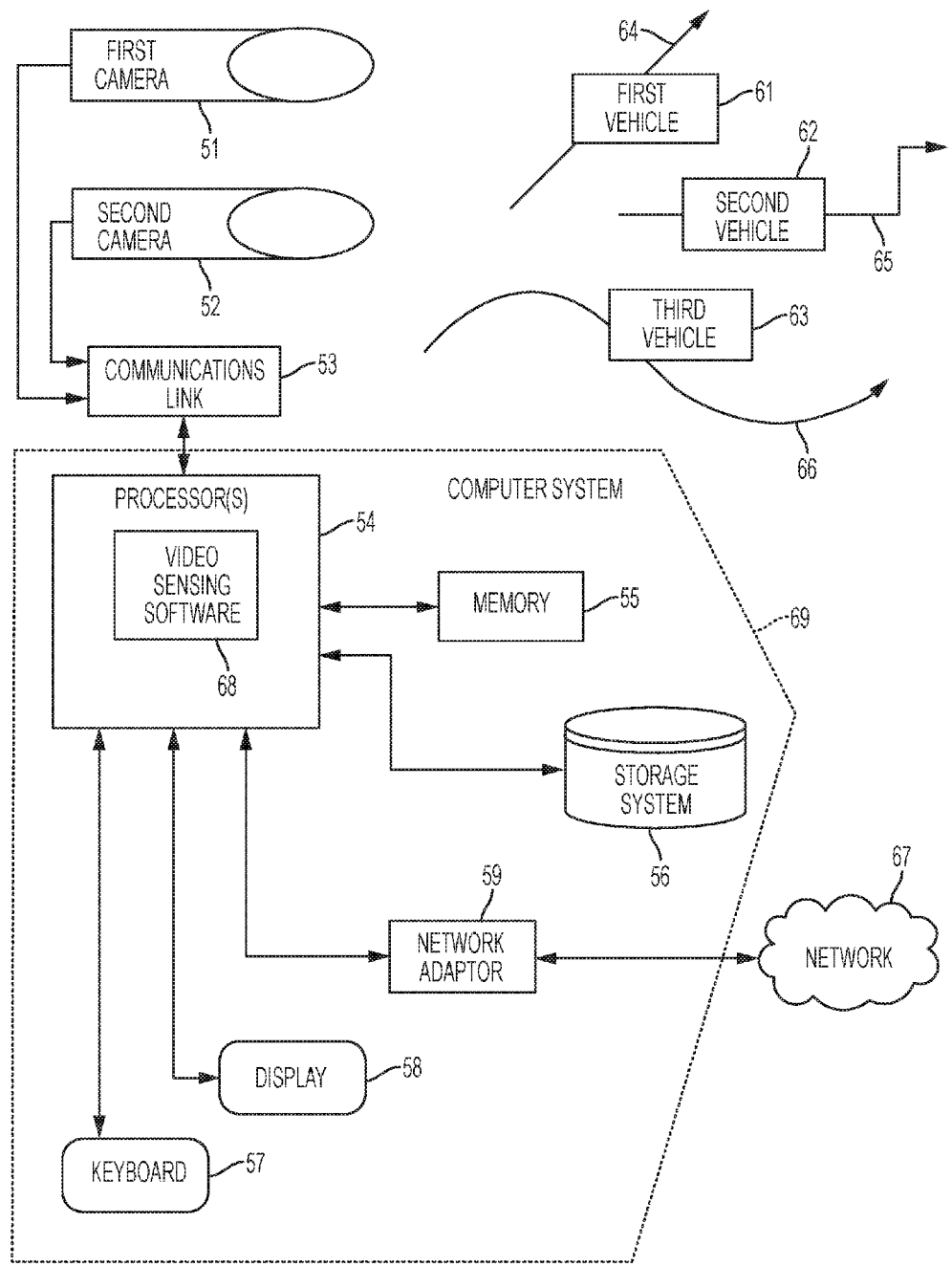
FIG. 1 is a hardware block diagram of an exemplary object tracking system.

FIG. 1 is a hardware block diagram of an exemplary object tracking system. One or more cameras, such as a first camera 51 and a second camera 52, are configured for gathering a sequence of image frames of one or more objects from a scene. In the example of FIG. 1, these objects include a first vehicle 61, a second vehicle 62, and a third vehicle 63. The first vehicle 61 is moving along a first track 64, the second vehicle 62 is moving along a second track 65, and the third vehicle 63 is moving along a third track 66.

The first and second cameras are operatively coupled to a computer system 69 via a communications link 53. Illustratively, the communications link 53 may be implemented using a wired link, a wireless link, or any of various combinations thereof Examples of wireless links include, but are not limited to, WiFi, WiMax, Bluetooth, and cellular. Wired links may be implemented, for example, using coaxial cable, Ethernet cable, multiconductor cable, or any of various combinations thereof.

The computer system 69 is only one example of a suitable processing system and is not intended to suggest any limitation as to the scope of use or functionality of embodiments of the methodology described herein. The computer system 69 may be implemented using any of numerous general purpose or special purpose computing system configurations. Some examples of illustrative configurations that may be used to implement the computer system 69 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the foregoing systems or devices, and the like.

The computer system 69 includes one or more processors 54 that are configured for executing a video sensing software 68 application. The video sensing software 68 is an application which interprets and evaluates sequences of image frames gathered by the first and second cameras 51 and 52, and generates a graph from these sequences of image frames. The computer system 69 may, but need not, be configured for executing additional instructions or program modules. Generally, program modules may include routines, programs, objects, components, logic, data structures, and so on that perform particular tasks or implement particular abstract data types.

The components of the computer system 69 may include, but are not limited to, the one or more processors 54 or processing units, a memory 55, a storage system 56, and a network adapter 59. The one or more processors 54 may include a module that performs the methods described herein. The module may be programmed into the integrated circuits of the one or more processors 54, or loaded from the memory 55, the storage system 56, or network 24 or combinations thereof. The computer system 69 may communicate with one or more peripheral devices such as a keyboard 57, a pointing device, a display 58, a touch screen, one or more devices that enable a user to interact with the computer system 69.

The computer system 69 may, but need not, be practiced in a distributed cloud computing environment where tasks are performed by remote processing devices that are linked through one or more communications networks. For example, the network adapter 59 may be used to provide a communications link between the computer system 69 and a network 67. The network 67 may provide access to one or more remote computer systems. In the distributed cloud computing environment, program modules may be located in both local and remote computer system storage media including memory storage devices.

The network adapter 59 may be implemented using any device that enables the computer system 69 to communicate with one or more other computing devices. Some illustrative examples of a suitable network adapter 59 include a network card, a wired modem, a wireless modem, a cellular mode, or any of various combinations thereof. For purposes of illustration, the computer system 69 can use the network adapter 59 to communicate with one or more networks such as the network 67. Network 67 may represent, for example, a local area network (LAN), a general wide area network (WAN), and/or a public network (e.g., the Internet), or a cloud computing system. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The computer system may include a variety of computer system readable media, such as the memory 55. Such media may be any available media that is accessible by computer system, and it may include both volatile and non-volatile media, removable and non-removable media. Likewise, the storage system 56 can include computer system readable media in the form of volatile memory, such as random access memory (RAM) and/or cache memory or others. The computer system 69 may further include other removable/non-removable, volatile/non-volatile computer system storage media. By way of example only, the storage system 56 can be provided for reading from and writing to a non-removable, non-volatile magnetic media (e.g., a "hard drive"), from a solid-state memory drive, from an optical drive, or from any of various combinations thereof. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the one or more processors 54 by one or more data media interfaces or busses.

In order to perform object tracking, the first camera 51 and the second camera 52 gather a sequence of image frames of one or more objects from a scene. For example, the one or more objects may include a first vehicle 61, a second vehicle 62, and a third vehicle 63. However, it should be understood that objects in the foil of vehicles are mentioned solely for purposes of illustration, as the objects could represent individuals, airplanes, missiles, agricultural equipment, animals, satellites, rockets, drones, or any of various other types of objects that are capable of motion. The first vehicle 61 is moving along a first track 64, the second vehicle 62 is moving along a second track 65, and the third vehicle 63 is moving along a third track 66.

The video sensing software 68 analyzes a few frames of the sequence of image frames to identify, for example, the first, second, and third vehicles 61, 62, and 63. The first vehicle 61 is determined to be at a first location and traveling at a first velocity. Likewise, the second vehicle 62 is determined to be at a second location and traveling at a second velocity, and the third vehicle 63 is determined to be at a third location and traveling at a third velocity. A weighted directed acyclic graph is constructed from this location and velocity information. A first node is used to represent a first tracklet for the first vehicle 61, a second node is used to represent a second tracklet for the second vehicle 62, and a third node is used to represent a third tracklet for the third vehicle 63.

Due to the presence of obstructions such as trees and buildings, and possible handoffs from the first camera 51 to the second camera 52, the video sensing software 68 may not be presented with sufficient information for determining a complete, continuous track for each of the first, second, and third vehicles 61, 62, and 63. However, the video sensing software 68 is able to calculate multiple tracklets for each of the first, second, and third vehicles 61, 62, and 63 If one tracklet, represented as the first node in the graph, is a possible continuation of a previous tracklet, as represented by a fourth node in the graph, then an arc or edge is added between the first and fourth nodes. The arc or edge is associated with a direction indicative of time, and is directed from a previous time to a later time.

A weight is associated with the arc or edge that is indicative of a strength or likelihood that the first node is, indeed, a continuation of the fourth node. For example, assume that the first vehicle 61 is an east-bound car traveling at 30 miles per hour (mph). The first node is used to represent the first vehicle. If the fourth node is associated with an east-bound car traveling at 25 mph, as opposed to a west-bound car traveling at 55 mph, then the first node is a possible continuation of the fourth node. Thus, an arc is added between the first and fourth nodes with a direction indicative of time. A weight is associated with the arc that is indicative of the strength of the possible continuation. For example, a 30 mph car in view of the first camera 51 is most likely to be continued by a 40 mph car in view of the second camera 52, and not by an 80 mph car in view of the second camera 52.

The directed acyclic graph produced by the video sensing software 68 can now be solved to obtain a set of most likely long tracks for each of the first, second, and third vehicles 61, 62, and 63. The set of most likely long tracks is indicative of a complete, continuous path for each of the vehicles 61, 62, and 63 from a starting time to an ending time. The graph may be solved using any of a number of polynomial-time methods. In the foregoing example, only kinematic information is considered for each of the vehicles 61, 62 and 63, such as velocity and instantaneous position. For example, the object tracking problem may be solved by determining a most likely track taken by the one or more objects using a maximum weight bipartite matching procedure applied to the simplified directed acyclic graph.

If attribute information is acquired for one or more of the vehicles 61, 62 and 63 in addition to the kinematic information, then a solution for the graph becomes a constrained path cover problem. Examples of attribute information may include a determination that Car A in scene number one is definitely the same as Car F in scene number seven because Car A and Car F both have the same license plate number. Constrained path cover problems have no known polynomial time solution, meaning that the solution time usually grows exponentially as problem size grows larger. However, according to a set of embodiments disclosed herein, polynomial time methods are described for solving special classes of graphs. These solutions can be used as building blocks to solve general graphs.

One special class of graphs relates to a Markov condition. The Markov condition, also called a Markov assumption or a path independence condition, states that any node in a Bayesian network is conditionally independent of its non-descendants, given its parents. Thus, the likelihood of an incremental track association does not depend upon the path that the track took to reach its present location. A Bayesian network is a probabilistic graphical model that represents a set of random variables and their conditional dependencies in the form of a directed acyclic graph (DAG).

The Markov condition holds for a number of applications, such that a log likelihood ratio can be assigned as a weight on an edge in the graph. For these applications, finding the best global solution in the form of a set of tracks essentially involves finding a maximum weight vertex-disjoint path cover of the weighted DAG. A vertex-disjoint path cover is a set of paths, including path of length zero (i.e., single vertex) such that each vertex belongs to one and only one path. This path cover problem can be solved very efficiently using maximum weight bipartite matching or minimum-cost, network flow algorithms.

Many applications exist for which the Markov condition does not hold. For example, long-term attribute information often leads to path dependence. In these situations, a need exists for finding the maximum weight vertex-disjoint path cover using any of a variety of constraints.

Graph-based tracking (GBT) employs a track graph comprising a plurality of edges E associated with a plurality of vertices V, such that each edge of the plurality of edges is associated with a pair of vertices of the plurality of vertices. The vertices V represent measurements and/or tracklets. The edges E represent possible associations after spatial and temporal gating. The track graph is denoted mathematically as G(V,E). A tracking problem for a set of tracks may be formulated as a vertex-disjoint path cover of the track graph G(V,E). A vertex-disjoint path cover is a set of paths, including path of length zero (i.e., single vertex) such that each vertex belongs to one and only one path.

The tracking problem involves a determination of the best path cover of the track graph according to certain criterion. If a Markov condition of path independence applies to the tracking graph, the tracking problem can be transformed into one of finding a maximum-weight, vertex-disjoint path cover for a directed acyclic graph (DAG). This problem can be efficiently solved using maximum weight bipartite matching or minimum cost network flow algorithms. However, attribute information often leads to path dependence, such that the Markov condition does not apply.

Figure 2A:
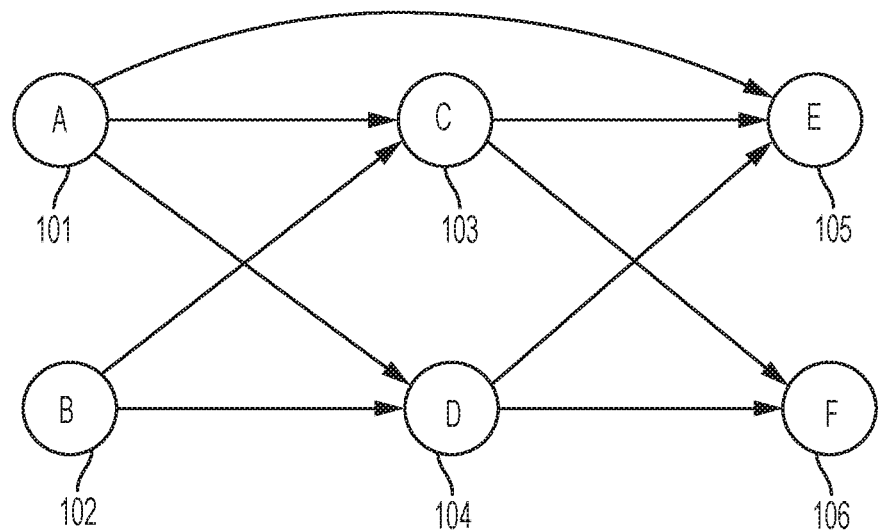
FIG. 2A is a diagrammatic representation of an illustrative valid path cover for a graph prepared using the system of FIG. 1.

FIG. 2A is a diagrammatic representation of an illustrative valid path cover of a track graph that includes three paths. A first path includes a first vertex A 101, a fourth vertex D 104, and a fifth vertex E 105. A second path includes a second vertex B 102 and a third vertex C 103. A third path includes a sixth vertex F 106. For many tracking problems, one may typically use a starting time stamp and/or a stopping time stamps for each of a plurality of measurements or tracklets to impose a direction of association from an earlier time to a later time. Accordingly, the track graphs considered herein are directed acyclic graphs unless otherwise stated.

Given a weighting function w(_) on a path p, for example as a function of a likelihood of the path p, then a best path cover can be defined as:

$$\mathcal{P}^* = \underset{\mathcal{P}}{\operatorname{argmax}} \sum_{p \in \mathcal{P}} \omega(p). \qquad (1)$$

Unfortunately, the general fond of Equation (1) does not permit efficient algorithms to be used in solving for the best path cover. One may not be able to reuse the result of w({DE}) in calculating both w({ADE}) and w({BDE}). The weighting function may be path dependent.

There are many applications where the likelihood of a track does satisfy a Markov, or path independence, condition. In such situations, one may assign a log likelihood ratio as a weight on an edge. In general terms, a likelihood ratio is a statistical test used to compare a goodness or closeness of fit between a first model and a second model. The first model is a null model representing a special case of the second model which is an alternative model. The likelihood ratio expresses how many times more likely the data are using one of the foregoing models (either the first or the second model) compared to the remaining model (the second model or the first model, respectively). This likelihood ratio, or equivalently its logarithm, can then be compared to a critical value to decide whether to reject the first model (the null model) in favor of the second model (the alternative model). When the logarithm of the likelihood ratio is used, the statistic is known as a log-likelihood ratio statistic. A best path cover is then defined as $$\mathcal{P}^* = \underset{\mathcal{P}}{\operatorname{argmax}} \sum_{p \in \mathcal{P}} \sum_{e \in p} \omega(e). \qquad (2)$$

where P* represents the best path cover, p represents a path, and w(e) is a weight on an edge of the track graph.

Figure 2B:
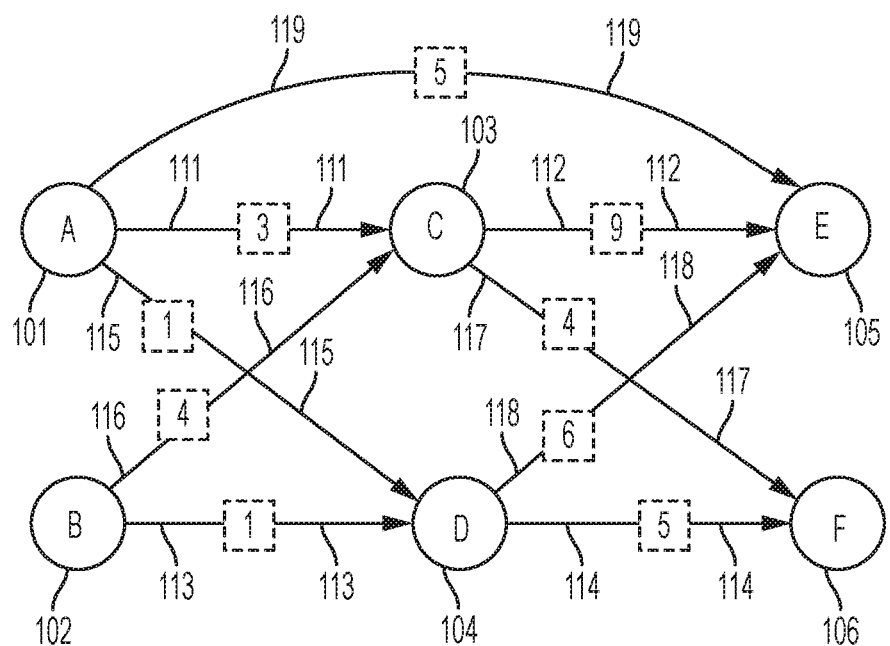
FIG. 2B shows an illustrative weighted object tracking graph prepared using the system of FIG. 1.

FIG. 2B is a diagrammatic representation of an illustrative weighted tracking graph 200 that exhibits path independence. Equation (2) defines a maximum weight path cover problem on the graph 200, which can be solved by maximum weight bipartite matching or minimum cost network flow. The weighted tracking graph 200 includes the first vertex A 101, the second vertex B 102, the third vertex C 103, the fourth vertex D 104, the fifth vertex E 105, and the sixth vertex F 106. A first edge 111 connects the first vertex A 101 to the third vertex C 103. A second edge 112 connects the third vertex C 103 to the fifth vertex E 105. A third edge 113 connects the second vertex B 102 to the fourth vertex D 104. A fourth edge 114 connects the fourth vertex D 104 to the sixth vertex F 106. A fifth edge 115 connects the first vertex A 101 to the fourth vertex D 104. A sixth edge 116 connects the second vertex B 102 to the third vertex C 103. A seventh edge 117 connects the third vertex C 103 to the sixth vertex F 106. An eighth edge 118 connects the fourth vertex D 104 to the fifth vertex E 105. A ninth edge 119 connects the first vertex A 101 to the fifth vertex E 105.

For purposes of illustration, the first edge 111 is assigned a weight of 3, the second edge 112 is assigned a weight of 9, the third edge 113 is assigned a weight of 1, the fourth edge 114 is assigned a weight of 5, the fifth edge 115 is assigned a weight of 1, the sixth edge 116 is assigned a weight of 4, the seventh edge 117 is assigned a weight of 4, the eighth edge 118 is assigned a weight of 6, and the ninth edge 119 is assigned a weight of 5.

Figure 3:
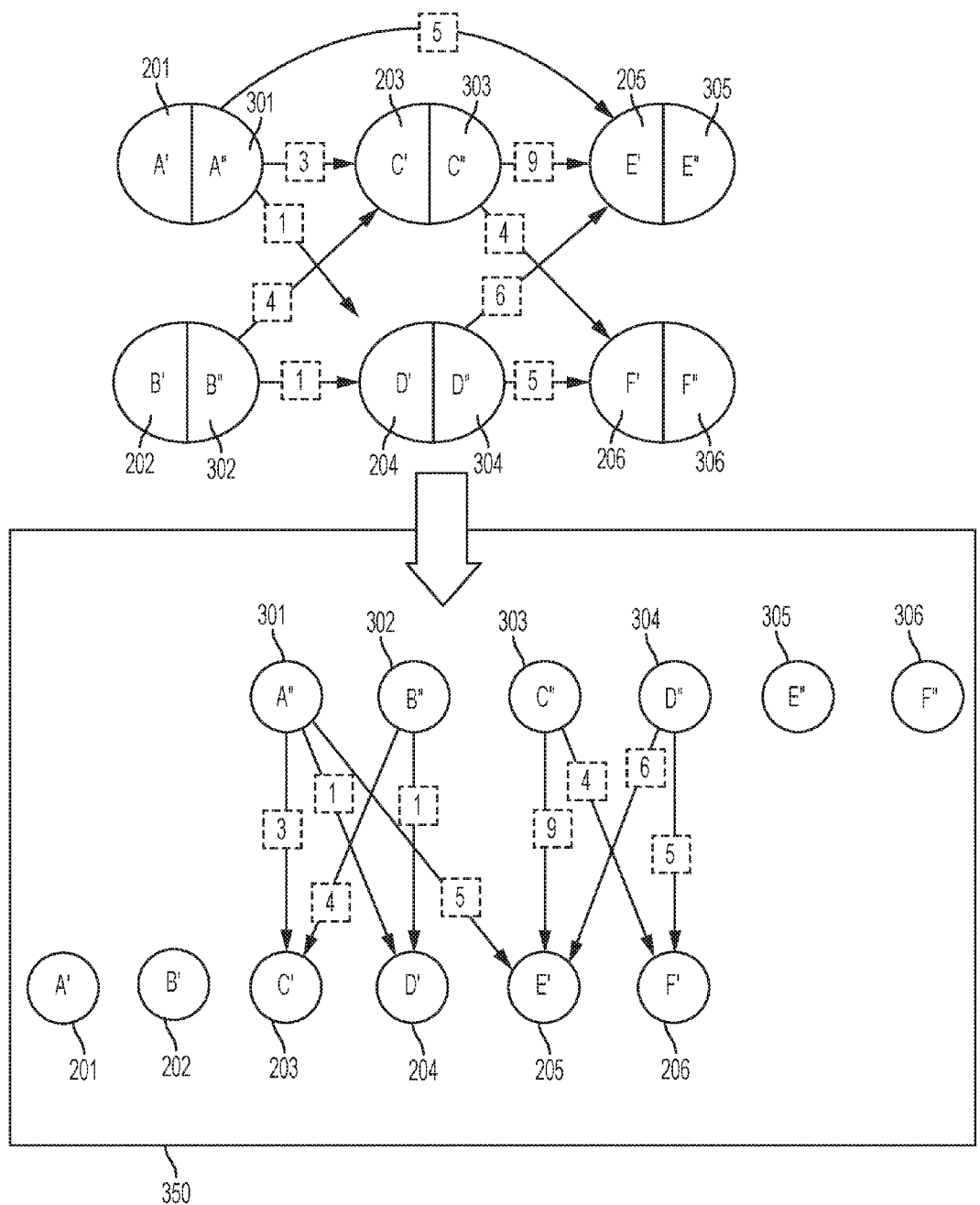
FIG. 3 is an exemplary directed acyclic graph for which a maximum weight path cover is solved for an object tracking problem using maximum weight bipartite matching.

FIG. 3 shows an illustrative directed acyclic graph (DAG) 300 for which a maximum weight path cover is solved for an object tracking problem using maximum weight bipartite matching. Pursuant to the maximum weight bipartite matching approach, each vertex v is "split" into two connected vertices v' and v", such that each in-arc of v goes into v' and each out-arc of v goes out of v". For example, the first vertex A 101 (FIGS. 2A and 2B) is split into a connected vertex A' 201 (FIG. 3) and a connected vertex A" 301. Likewise, the second vertex B 102 (FIGS. 2A and 2B) is split into a connected vertex B' 202 and a connected vertex B" 302. The third vertex C 103 (FIGS. 2A and 2B) is split into a connected vertex C' 203 (FIG. 3) and a connected vertex C" 303. Likewise, the fourth vertex D 104 (FIGS. 2A and 2B) is split into a connected vertex D' 204 and a connected vertex D" 304. The fifth vertex E 105 (FIGS. 2A and 2B) is split into a connected vertex E' 205 (FIG. 3) and a connected vertex E" 305. Likewise, the sixth vertex F 106 (FIGS. 2A and 2B) is split into a connected vertex F' 206 and a connected vertex F" 306.

The DAG 300 is used to generate a resultant bipartite companion graph 350 incorporating the connected vertices A' 201, A" 301, B' 202, B"302, C' 203, C" 303, D' 204, D" 304, E' 205, E" 305, F' 206, and F" 306. Maximum weight bipartite matching may be applied to the bipartite companion graph 350 to provide edges that can be assembled into paths to give the solution to Equation (2). A level of complexity for solving for the maximum weight bipartite matching may be determined using an algorithm well known to those skilled in the relevant art as the Hungarian algorithm $O(|V|^2)$ where |•| denotes cardinality.

Attribute information often leads to track dependence such that the Markov condition is not satisfied. For example, assume that color information is available for each of a plurality of vehicles being tracked. A determination of whether a red car should be "stitched" with a car in an earlier frame, whose color is not observed, depends not only on kinematics, but also on whether this no-color car has already been stitched with an orange car even earlier. In these situations, a path weight cannot be written as a sum of edge weights, and one must solve the tracking problem using the more complicated approach of Equation (1) relative to Equation (2). Nevertheless, it may be possible to formulate a simplified problem where the more elegant approach of Equation (2) may be applied, even though the Markov condition does not hold.

Consider a simplified or constrained tracking problem where each of a plurality of attributes is used to provide a hard constraint and nothing more. More specifically, propagation and likelihood models do not exist for the attribute. The only information to be extracted and used is whether or not a particular path is valid. In these situations, if a weighted track graph using only path independent information such as kinematics is constructed, then a valid path for the constrained tracking problem has the same weight as in the unconstrained case, while an invalid path has a weight of minus infinity. Accordingly, one may attempt to solve Equation (2) by obtaining the maximum weight path cover, but subject to one or more hard constraints on the validity of each of a plurality of paths. For purposes of illustration, one may consider a single same-track constraint that a given pair of vertices have to be on the same path. Such a constraint is termed a positive constraint and applies when the pair of measurements or tracklets are known to be from the same target. By contrast, when a pair of vertices are required not to be on the same path, due to the fact that the pair of measurements are known to be from different targets or tracklets, this is considered to be a negative constraint. The tracking problem may be solved using a so-called greedy algorithm for a single positive constraint, a single negative constraint, or multiple positive constraints.

A greedy algorithm is a mathematical process that looks for simple, easy-to-implement solutions to complex, multistep problems by deciding which next step will provide the most obvious benefit. Such algorithms are called greedy because, while the optimal solution to each smaller instance will provide an immediate output, the algorithm does not consider the larger problem as a whole. Once a decision has been made, it is never reconsidered. Greedy algorithms work by recursively constructing a set of objects from the smallest possible constituent parts. Recursion is an approach to problem solving in which the solution to a particular problem depends on solutions to smaller instances of the same problem. One advantage to using a greedy algorithm is that solutions to smaller instances of the problem can be straightforward and easy to understand. However, a disadvantage is that recursively performing optimal short-term solutions may possibly lead to the worst possible long-term outcome.

Figure 4:
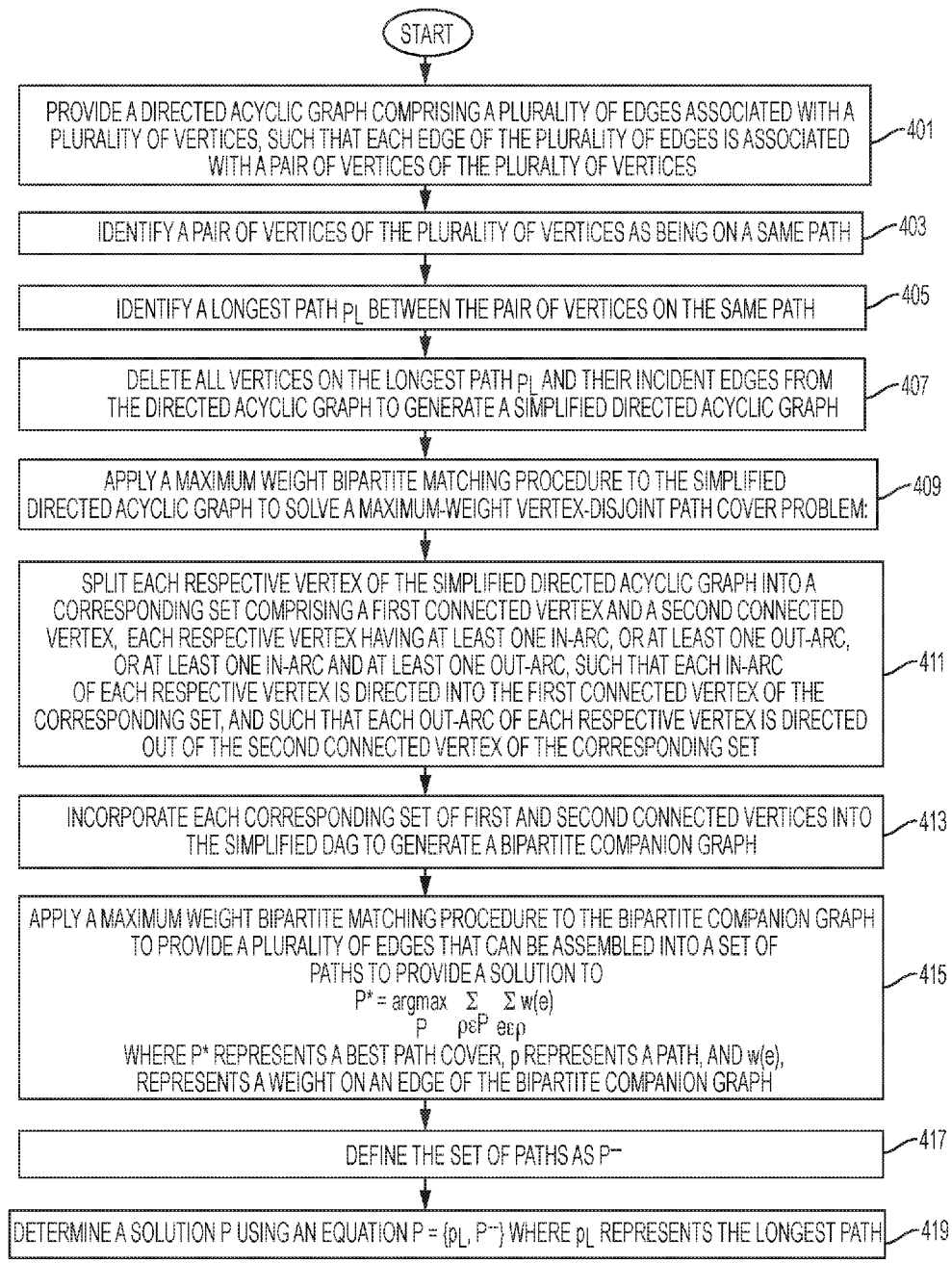
FIG. 4 is flowchart setting forth an illustrative greedy process for solving an object tracking problem by identifying a maximum-weight vertex-disjoint path cover for a plurality of edges using a single positive constraint.

FIG. 4 is flowchart setting forth an illustrative greedy algorithm for solving an object tracking problem by identifying a maximum-weight vertex-disjoint path cover for a plurality of edges using a single positive constraint. This greedy algorithm provides an approximate solution. The algorithm commences at block 401 where a directed acyclic graph (DAG) is provided comprising a plurality of edges associated with a plurality of vertices, such that each edge of the plurality of edges is associated with a pair of vertices of the plurality of vertices. Next, at block 403, a pair of vertices of the plurality of vertices is identified as being on the same path. The procedure progresses to block 405 where a longest path, $p_L$, between the pair of vertices is identified. Then, at block 407, all vertices on $p_L$ and their incident edges are deleted from the DAG to generate a simplified DAG.

At block 409, a maximum weight bipartite matching procedure is applied to the simplified DAG to solve a maximum weight vertex-disjoint path cover problem. Pursuant to the maximum weight bipartite matching approach discussed previously in connection with FIG. 3, each respective vertex of the simplified DAG is split into a corresponding set comprising a first connected vertex and a second connected vertex. Each respective vertex of the simplified DAG has at least one in-arc, or at least one out-arc, or at least one in-arc and at least one out-arc, such that each in-arc of each respective vertex is directed into the first connected vertex of the corresponding set, and such that each out-arc of each respective vertex is directed out of the second connected vertex of the corresponding set. Thus, each vertex v of the simplified DAG is "split" into two connected vertices v' and v", such that each in-arc of v goes into v' and each out-arc of v goes out of v" (block 411). Next, at block 413, each corresponding set of first and second connected vertices are incorporated into the simplified DAG to generate a bipartite companion graph. Maximum weight bipartite matching is applied to the bipartite companion graph (block 415) to provide a plurality of edges that can be assembled into a set of paths to provide a solution to Equation (2). At block 417, the set of paths is defined as $P^{--}$. Then, at block 419, an approximate solution P is determined using an equation $P=\{p_L, P^{--}\}$ where $p_L$ represents the longest path.

By considering the track graph of FIG. 2B, it is apparent that the greedy algorithm does not always provide the optimal solution for the maximum weight vertex-disjoint path cover problem for a single positive constraint. For example, if a same-track pair is defined as vertex A 101-vertex F 106 (FIGS. 2A-2B), then a greedy solution formulated using the method of FIG. 4 is (vertex A 101, vertex C 103, vertex F 106; vertex B 102, vertex D 104, vertex E 105) with a total weight of 14. However, note that the optimal solution is actually (vertex A 101, vertex D 104, vertex F 106; vertex B 102, vertex C 103, vertex E 105) with a total weight of 19.

For a small graph, it is possible to solve the maximum weight vertex-disjoint path cover problem for a single positive constraint using a brute-force algorithm that enumerates all connecting paths between the same-track pair. For each of these enumerated paths, the steps of the greedy algorithm of FIG. 4 are followed. However, the number of connecting paths can grow exponentially as the graph becomes larger, and as the distance between the same-track pair of vertices increases. Thus, there is reason to suspect that the constrained maximum weight path cover problem for a single positive constraint could be non-deterministic polynomial-time (NP)-hard. Some other types of constrained path cover problems were considered in the context of computer program testing, and many of these problems were proven to be NP-hard.

NP refers to a class of decision problems decidable by a non-deterministic Turing machine that runs in polynomial time. Likewise, NP-hardness refers to a class of problems that are at least as hard as the hardest problems in NP. More precisely, a problem H is NP-hard when every problem L in non-deterministic polynomial time can be reduced in polynomial time to H As a consequence, finding a polynomial algorithm to solve any NP-hard problem would give polynomial algorithms for all problems in NP, which is unlikely as many of them are considered hard.

By contrast, polynomial time (P) refers to a class of decision problems that can be solved by a deterministic Turing machine using a polynomial amount of computation time. An algorithm is said to be of polynomial time if its running time is upper bounded by a polynomial expression in the size of the input for the algorithm, i.e., $T(n)=O(n^k)$ for some constant k. Cobham's thesis states that polynomial time is a synonym for "tractable", "feasible", "efficient", or "fast". Some illustrative examples of polynomial time algorithms include basic arithmetic operations such as addition, subtraction, multiplication, division, and comparison, as well as performing maximum matchings in graphs.

The possibility that the maximum weight vertex-disjoint path cover problem is NP-hard suggests that efficient algorithms for special classes of graphs should be developed and used as subroutines in a general search. For example, consider a graph G(V,E) that is a trellis. A trellis is a graph whose vertices are ordered into vertical slices, each slice representing a time slot. Each of the vertices at each of the time slots is connected to at least one other vertex at an earlier time or at least one other vertex at a later time. A set of vertices V for the trellis graph can be divided into disjoint subsets, called stages, of vertices $\{V_i\}$, i=1, 2, ... N, such that any edge $e=v_iv_j$ is between two adjacent stages, i.e., there is an index t such that $v_i \in V_t$ and $v_j \in V_{t+1}$.

Figure 5:
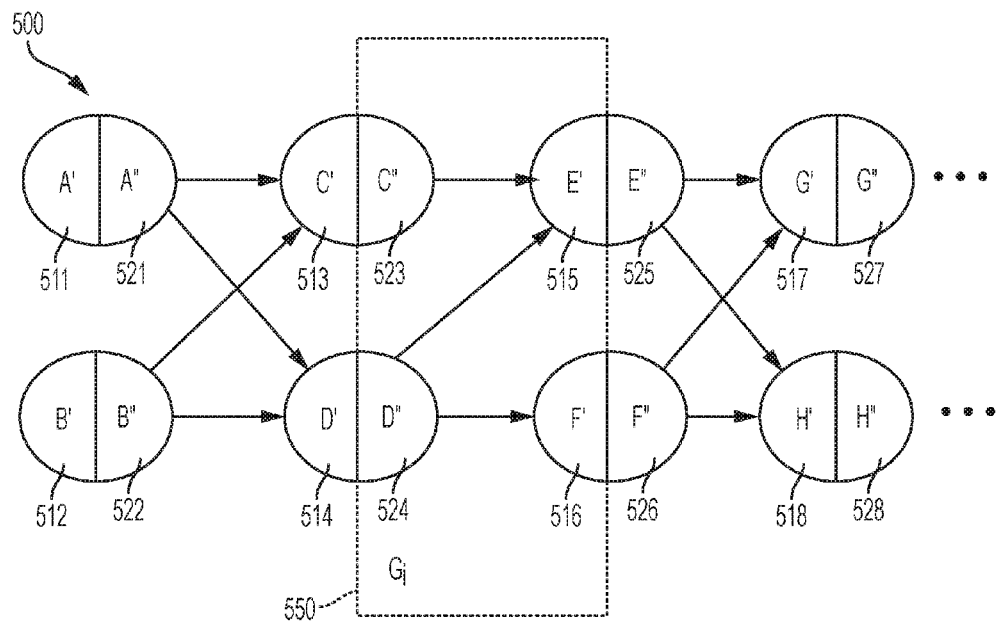
FIG. 5 is a first exemplary trellis graph that has been processed to generate a bipartite trellis graph by splitting each vertex.

FIG. 5 shows an exemplary trellis graph that has been processed to generate a bipartite trellis graph G 500 for solving an object tracking problem where each vertex v has been split into v' and v" as discussed previously in connection with the bipartite companion graph 350 of FIG. 3. In the example of FIG. 5, a first vertex has been split into a vertex A' 511 and a vertex A" 521. Likewise, a second vertex has been split into a vertex B' 512 and a vertex B" 522. A third vertex has been split into a vertex C' 513 and a vertex C" 523. Similarly, a fourth vertex has been split into a vertex D' 514 and a vertex D" 524. A fifth vertex has been split into a vertex E' 515 and a vertex E" 525. Likewise, a sixth vertex has been split into a vertex F' 516 and a vertex F" 526. A seventh vertex has been split into a vertex G' 517 and a vertex G" 527. An eighth vertex has been split into a vertex H' 518 and a vertex H" 528.

Consider a subgraph $G_i$ 550 of the bipartite trellis graph G 500 formed by edges between two temporally adjacent stages and their associated vertices C" 523, D" 524, E' 515, and F' 516. A local matching $M_i$ is associated with the subgraph $G_i$ 550. It is apparent that the bipartite trellis graph 500 is the union of a plurality of subgraphs $G_n$, including the subgraph $G_i$ 550, where n is a positive integer greater than or equal to i and used to denote a total number of subgraphs in the plurality of subgraphs $G_n$. The subscript i of subgraph $G_i$ 550 is positive integer used to identify a specific subgraph i from among the plurality of subgraphs $G_n$ in the bipartite trellis graph G 500. Likewise, a union of the "local" matchings $M_n$ for the plurality of subgraphs $G_n$, including the local matching $M_i$ for the subgraph $G_i$ 550, always forms a valid matching M for the entire bipartite trellis graph G 500. It is this property of trellis graphs that will be exploited in constructing an efficient algorithm for the weight vertex-disjoint path cover problem with the same-track constraint applied. FIG. 5 clearly illustrates that, in the trellis graph G 500, a local matching does not interfere with other local matchings, and a union of local matchings is always a valid global matching.

Figure 6:
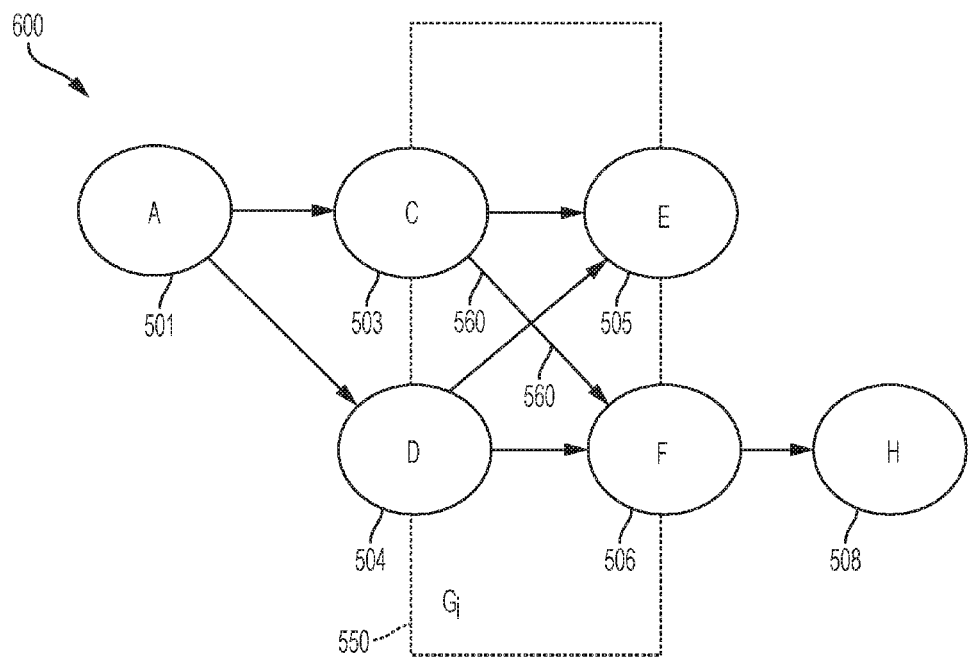
FIG. 6 is an exemplary auxiliary graph corresponding to the bipartite trellis graph of FIG. 5.

FIG. 6 shows an exemplary auxiliary graph 600 corresponding to the trellis graph 500 of FIG. 5. Whereas the trellis graph G 500 of FIG. 5 shows each respective vertex v being split into v' and v", the auxiliary graph 600 of FIG. 6 shows vertices v corresponding to the vertices of FIG. 5, but where each vertex v has not been split into v' and v". More specifically, FIG. 6 shows a vertex A 501 corresponding to the vertex A' 511 and the vertex A" 521 of FIG. 5. Likewise, FIG. 6 illustrates a vertex C 503 corresponding to the vertex C' 513 and the vertex C" 523 of FIG. 5. The vertex D' 514 and the vertex D" 524 of FIG. 5 correspond to the vertex D 504 of FIG. 6, and the vertex E' 515 and the vertex E" 525 correspond to the vertex E 505 of FIG. 6. Similarly, the vertex F' 516 and the vertex F" 526 of FIG. 5 correspond to the vertex F 506 of FIG. 6, and the vertex H' 518 and the vertex H" 528 of FIG. 5 correspond to the vertex H 508 of FIG. 6.

Assume that vertex A 501 and vertex H 508 of FIG. 6 are the same-track pair representing the single positive constraint. Further assume that an edge CF 560 is included in an optimal global solution. It follows that, in the subgraph $G_i$ 550 (FIGS. 5 and 6), the local matching of a "remaining" graph, after the vertices C 503 and F 506 and their incident edges are deleted, has to be optimal. One may thus obtain a weight for the edge CF 560 in the auxiliary graph 600 of FIG. 6 and find a connecting path in the global optimal solution by finding the longest path in the auxiliary graph 600.

Figure 7A:
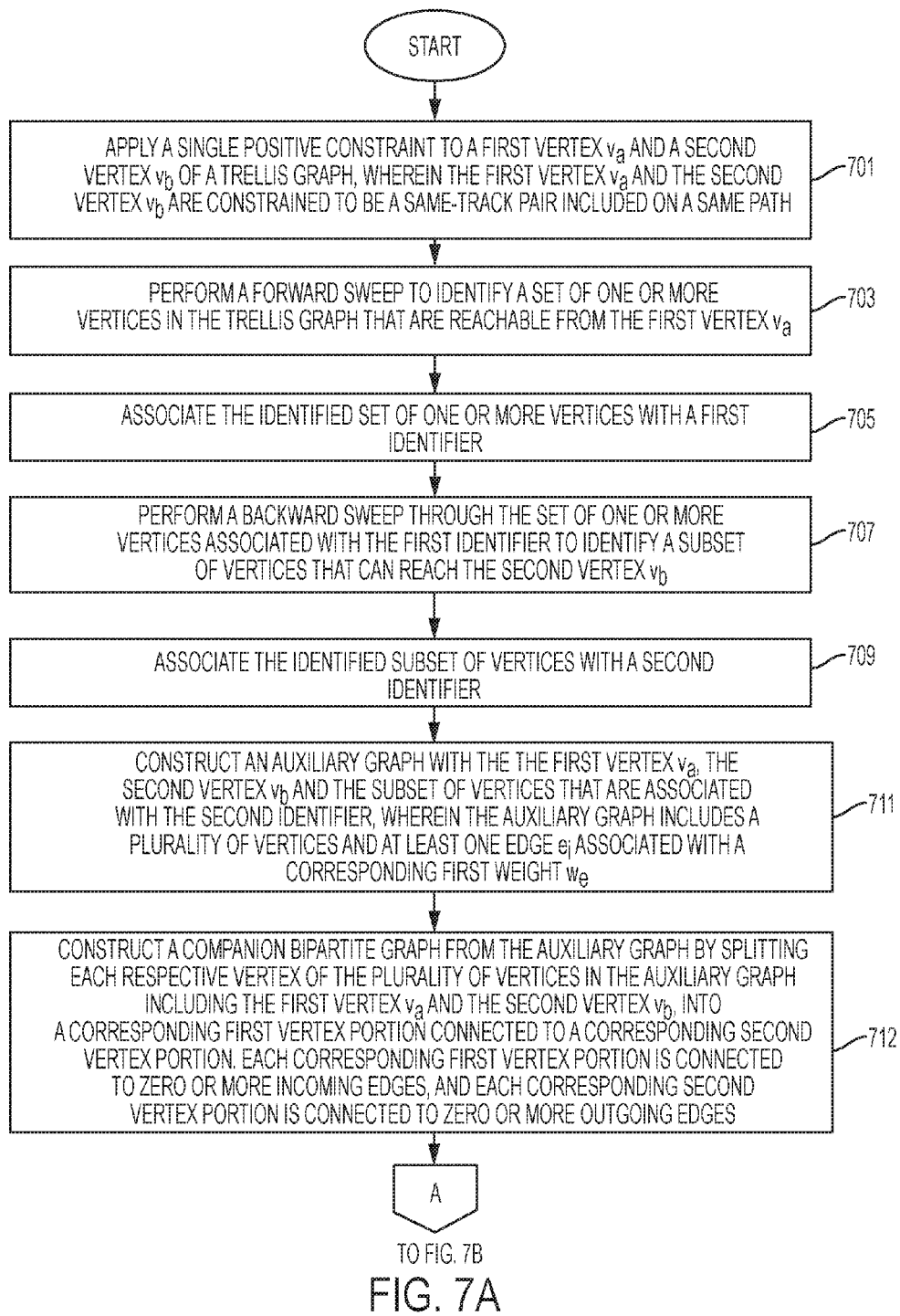
FIGS. 7A and 7B together comprise a flowchart setting forth an illustrative trellis-based procedure for solving an object tracking problem by identifying a maximum-weight vertex-disjoint path cover for a plurality of edges using a single positive constraint.
Figure 7B:
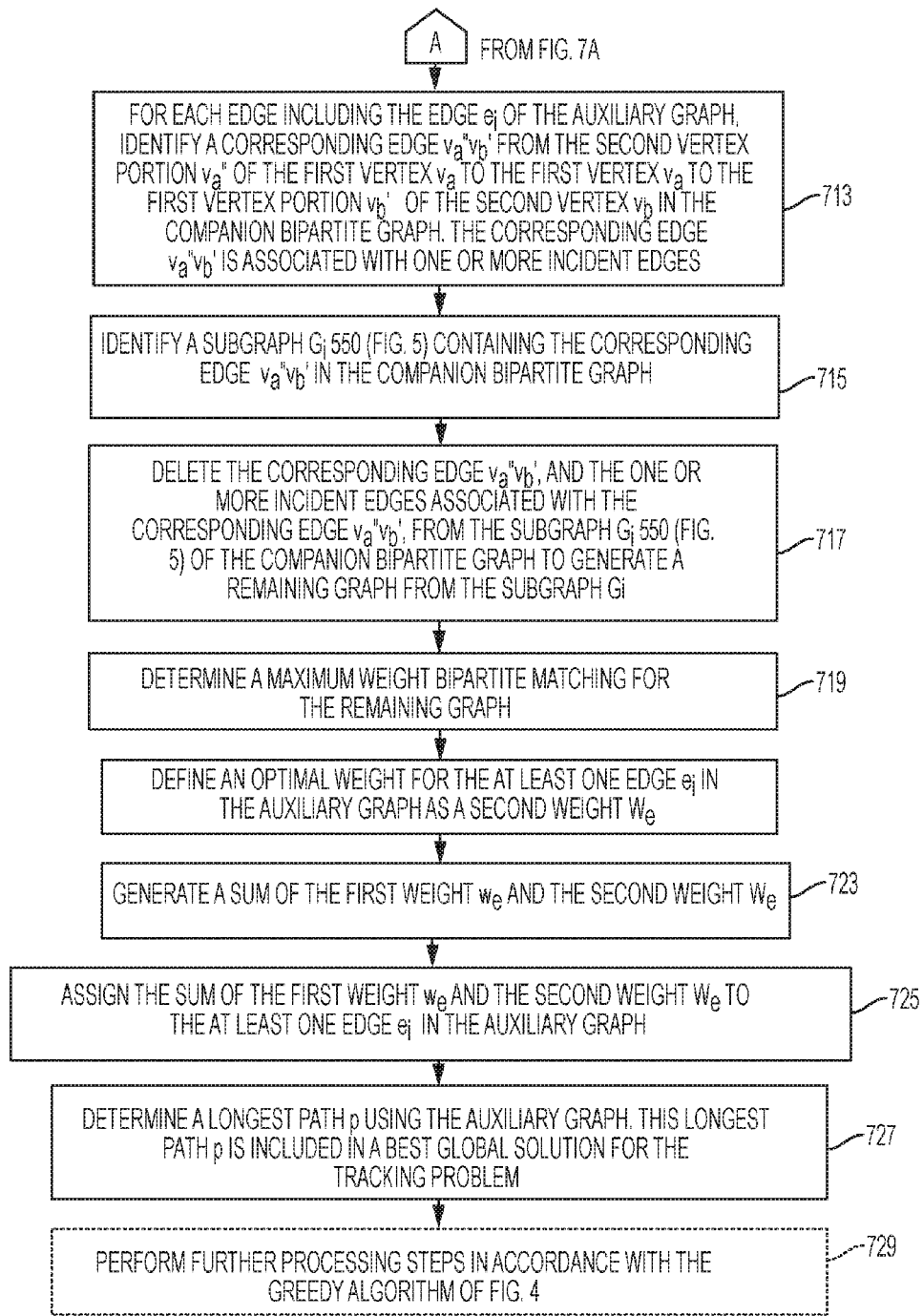

FIGS. 7A and 7B together comprise a flowchart setting forth an illustrative trellis algorithm for solving an object tracking problem by identifying a maximum-weight vertex-disjoint path cover for a plurality of edges using a single positive constraint. This trellis algorithm provides an exact solution for the tracking problem. The program commences at block 701 (FIG. 7A) where a single positive constraint is applied to a first vertex $v_a$ and a second vertex $v_b$ of a trellis graph, wherein the first vertex $v_a$ and the second vertex $v_b$ are constrained to be a same-track pair on a same path. The first vertex $v_a$ is earlier than the second vertex $v_b$ with reference to a topological sort. The topological sort, sometimes referred to as a topological ordering of a directed graph, is a linear ordering of the vertices of the graph such that, for every directed edge ab from the first vertex $v_a$ to the second vertex $v_b$, the first vertex $v_a$ comes before the second vertex $v_b$ in the linear ordering.

Next, at block 703, a forward sweep is performed to identify a set of one or more vertices in the trellis graph that are reachable from the first vertex $v_a$. The set of one or more vertices is associated with a first identifier at block 705. For example, associating the set of one or more vertices with the first identifier may comprise marking the set of one or more vertices in gray.

The program progresses to block 707 where a backward sweep is performed through the set of one or more vertices to identify a subset of vertices that can reach the second vertex $v_b$. At block 709, the subset of vertices is associated with a second identifier. For example, associating the subset of vertices with the second identifier may comprise marking the subset of vertices in black. Next, at block 711, an auxiliary graph is constructed with the first vertex $v_a$, the second vertex $v_b$, and the subset of vertices that are associated with the second identifier. The auxiliary graph includes a plurality of vertices and at least one edge $e_i$ associated with a first weight $w_e$.

At block 712, a companion bipartite graph is constructed from the auxiliary graph by splitting each respective vertex of the plurality of vertices in the auxiliary graph, including the first vertex $v_a$ and the second vertex $v_b$, into a corresponding first vertex portion connected to a corresponding second vertex portion. For example, the first vertex $v_a$ is split into a first vertex portion $v_a'$ and a second vertex portion $v_a''$ each corresponding to the first vertex $v_a$. Similarly, the second vertex $v_b$ is split into a first vertex portion $v_b'$ and a second vertex portion $v_b''$ each corresponding to the second vertex $v_b$. Each corresponding first vertex portion is connected to zero or more incoming edges, and each corresponding second vertex portion is connected to zero or more outgoing edges.

The operational sequence progresses from block 712 (FIG. 7A) to block 713 (FIG. 7B) where, for each edge including the edge $e_i$ of the auxiliary graph, a corresponding edge $v_a''v_b'$ from the second vertex portion $v_a''$ of the first vertex $v_a$ to the first vertex portion $v_b'$ of the second vertex $v_b$ is identified in the companion bipartite graph. The corresponding edge $v_a''v_b'$ is associated with one or more incident edges. Then, at block 715, a subgraph $G_i$ 550 (FIG. 5) that contains the corresponding edge $v_a''v_b'$ is identified in the companion bipartite graph. The corresponding edge $v_a''v_b'$, and the one or more incident edges associated with the corresponding edge $v_a''v_b'$, are deleted from the subgraph $G_i$ 550 of the companion bipartite graph to generate a remaining graph from the subgraph $G_i$ (FIG. 7B, block 717). A maximum weight bipartite matching is determined for the remaining graph (block 719). An optimal weight for the at least one edge $e_i$ in the auxiliary graph is defined as a second weight $W_e$ (block 721). A sum of the first weight $w_e$ and the second weight $W_e$ is generated as $w_e + W_e$ (block 723). The sum of the first weight $w_e$ and the second weight $W_e$ is assigned to the at least one edge $e_i$ in the auxiliary graph (block 725). Next, a longest path p is determined using the auxiliary graph (block 727). This longest path p is included in a best global solution for the tracking problem. Optionally, at block 729, further processing steps may be performed in accordance with the greedy algorithm described in connection with FIG. 4.

A worst-case running time for the trellis algorithm of FIGS. 7A-7B is $O(n^5)$ where $n=1|V|$, since there are at most $O(n^2)$ edges, each costing $O(n^3)$ to solve for the optimal weight in the subgraph $G_i$ 550 (FIG. 5). In practice, one illustrative case is a trellis having N>>1 stages with m=O(1) vertices in each stage. There are $m^N$ possible connecting paths, but the trellis algorithm can be run with $m^5N$ (polynomial) time.

Numerical Examples

Figure 8:
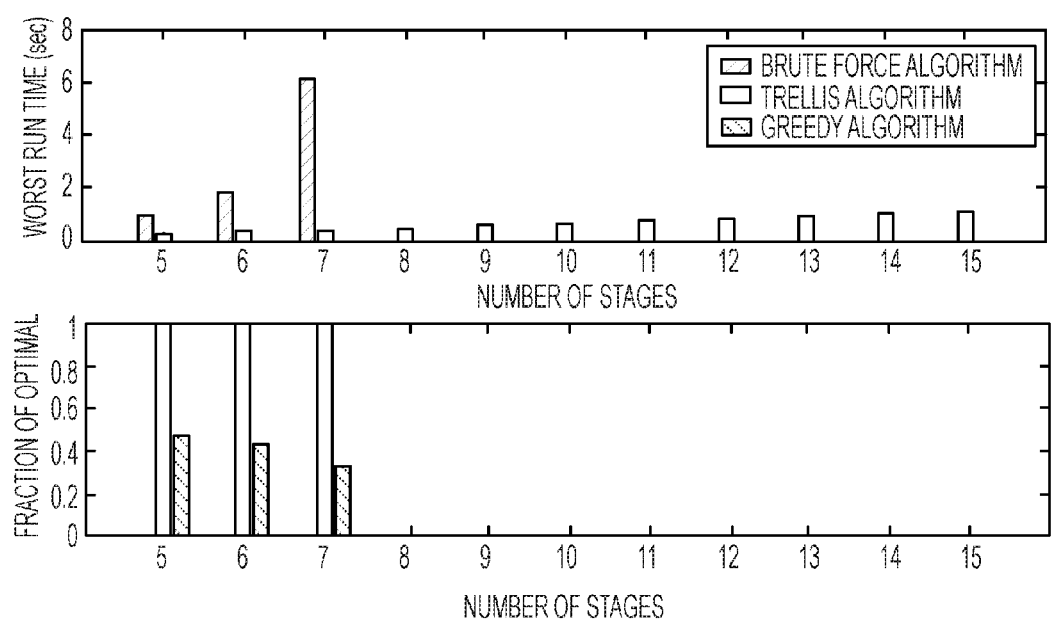
FIG. 8 is a bar graph providing a comparative analysis of the performance of the trellis-based procedure of FIGS. 7A and 7B with the greedy process of FIG. 4 and a brute-force approach.

With reference to FIG. 8, Monte Carlo runs were conducted to evaluate the trellis algorithm of FIGS. 7A-7B, and to compare this algorithm with the greedy algorithm of FIG. 4 and a brute-force algorithm. More specifically, m=6 was chosen for the number of vertices in a stage, and the number of stages N was varied from 5 to 15. For each (m;N) configuration, 100 Monte Carlo runs were conducted to record the worst running time. In each run, 50% of all possible edges are randomly chosen to be present with a weight uniformly distributed between −1 and 1.

The worst running times and the fractions of optimal solutions are plotted in FIG. 8. Results for all N values are combined for better visualization even though the brute force algorithm is run for only three values of N. Both the trellis algorithm and the greedy algorithm are run for all values of N. The brute force algorithm is run for only N=5; 6 and 7. In these 3 settings, the solutions obtained by the trellis algorithm and the greedy algorithm are judged against the optimal solution obtained by the brute force algorithm, and the fraction of the optimal solutions out of all runs is recorded for the two algorithms. This fraction is always 1 for the trellis algorithm, as reasoned before, but less than 0.5 for the greedy algorithm.

Figure 9:
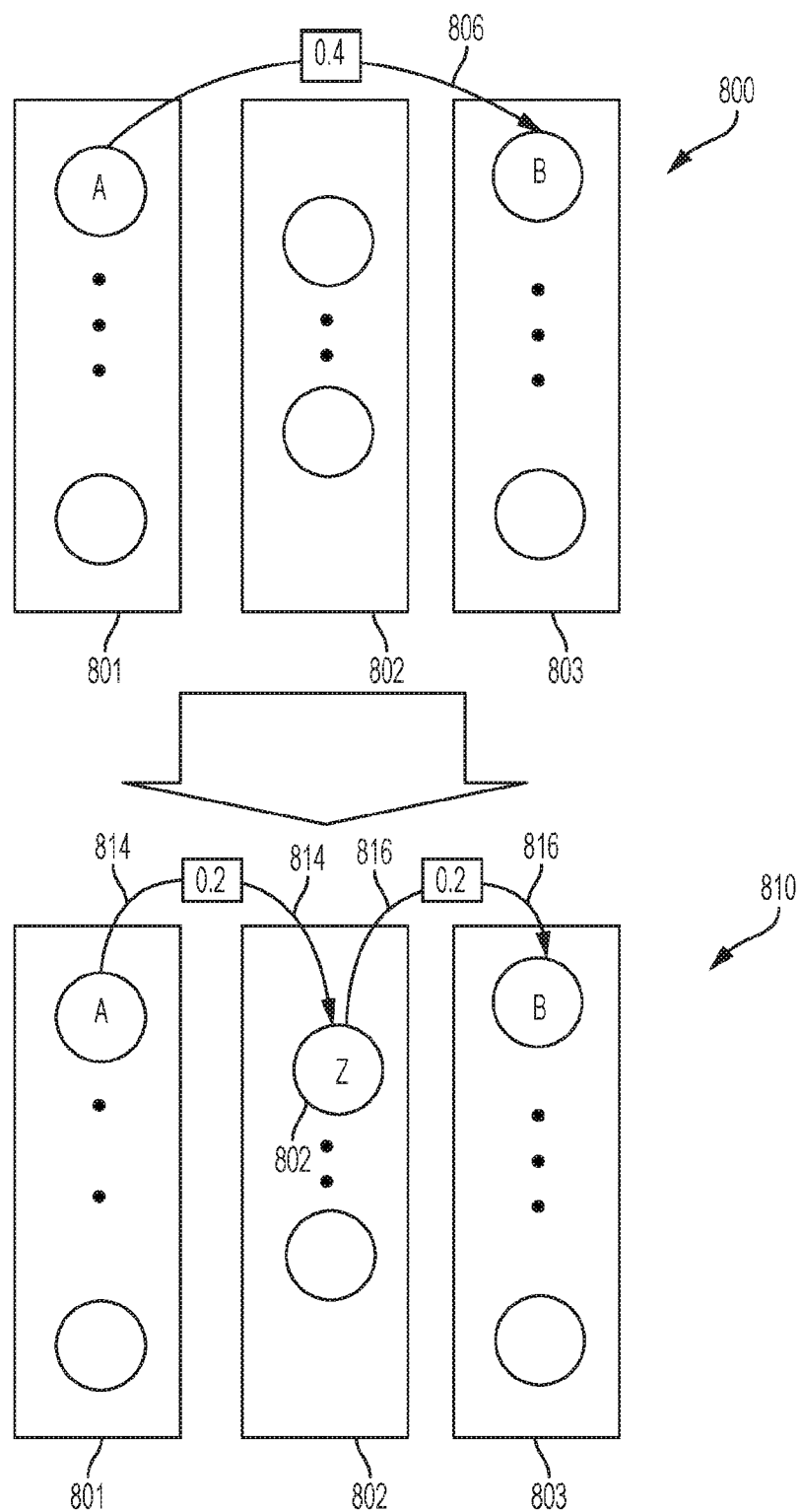
FIG. 9 illustrates an exemplary transformation of an original graph into a trellis graph by adding an auxiliary vertex to the original graph.

FIG. 9 illustrates an exemplary transformation of an original graph 800 into an auxiliary trellis graph 810 by adding an auxiliary vertex Z 820 to the original graph 800. Pursuant to a further set of embodiments disclosed herein, the trellis algorithm of FIGS. 7A-7B may be used as a search algorithm for a general case. For example, consider the original graph 800 shown in FIG. 9 which comprises a plurality of temporally related stages including a first stage 801, a second stage 802, and a third stage 803. The first stage 801 represents a first time window, the second stage 802 represents a second time window, and the third stage 803 represents a third time window. The first stage 801 is immediately adjacent to the second stage 802, and the third stage 803 is not immediately adjacent to the first stage 801.

If an edge AB 806 "jumps over" a stage such as the second stage 802, then one may construct the auxiliary trellis graph 810 by adding an auxiliary vertex Z 820 in the stage that is jumped over. Any solution for the original graph 800 can be expressed as a solution for the auxiliary trellis graph 810. For example, if the edge AB 806 is in the solution on the original graph 800, then replacing the edge AB 806 with edges AZ 814 and ZB 816 is a valid solution on the auxiliary trellis graph 810.

If the edge AB 806 is not in the solution in the original graph 800, then the solution is valid in the auxiliary trellis graph 810 which does not include either edge AZ 814 or edge ZB 816. Therefore, if one solves for an optimal solution using the auxiliary trellis graph 810, and it is a valid solution on the original graph 800 (i.e., the solution contains either both edges AZ 814 and ZB 816, or neither of the edges AZ 814 and ZB 816), then it is the optimal solution for the original graph 800. If, however, only one of edge AZ 814 and edge ZB 816 is present in the solution, then one needs to search further.

Suppose that edge AZ 814 is present and edge ZB 816 is absent. Instead of splitting the weight of edge AB 806 equally between edge AZ 814 and edge ZB 816, one may decrease the weight on edge AZ 814 and increase the weight on edge ZB 816 while maintaining the same sum. If one solves again the problem for the trellis of the auxiliary trellis graph 810, edge AZ 814 may, in fact, disappear from the optimal solution, and this optimal solution will also be valid for the original graph 800. Situations where edge AZ 814 is absent but edge ZB 816 is present can be handled similarly to the previously-described scenario where edge AZ 814 was present and edge ZB 816 was absent. The foregoing procedure has the potential to terminate with an optimal solution, but this is not guaranteed.

Figure 10:
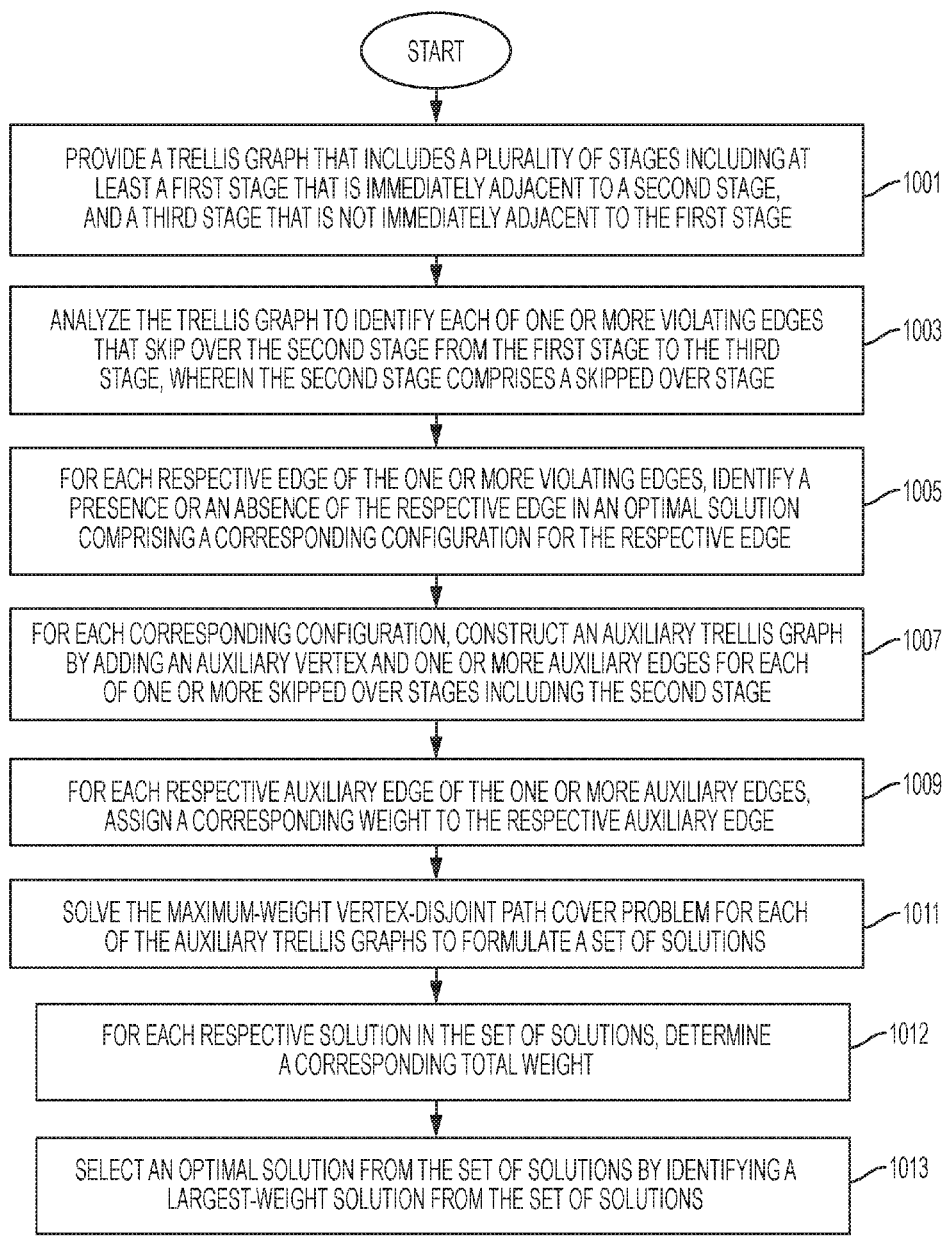
FIG. 10 is a flowchart setting forth an illustrative searching procedure for solving an object tracking problem by determining an optimal solution for a maximum-weight vertex-disjoint path cover for a plurality of edges in general cases.

FIG. 10 is a flowchart setting forth an illustrative searching procedure for determining an optimal solution for an object tracking problem by identifying a maximum-weight vertex-disjoint path cover for a plurality of edges in general cases. The searching procedure of FIG. 10 is guaranteed to terminate with an optimal solution, but the procedure is practical only if a number of "violating" edges 806 (FIG. 8) that jump over stages is small enough. The procedure of FIG. 10 commences at block 1001 where a trellis graph is provided that includes a plurality of stages including at least a first stage that is immediately adjacent to a second stage, and a third stage that is not immediately adjacent to the first stage. Next, the trellis graph is analyzed to identify each of one or more violating edges that skip over the second stage and run from the first stage to the third stage, wherein the second stage comprises a skipped over stage (block 1003). For each respective edge of the one or more violating edges, a presence or an absence of the respective edge is identified in an optimal solution comprising a corresponding configuration for the respective edge (block 1005). If there are L violating edges, then a total number of identified corresponding configurations is $2^L$.

For each corresponding configuration, an auxiliary trellis graph is constructed by adding an auxiliary vertex and one or more auxiliary edges for each of one or more skipped over stages including the second stage (block 1007). For each respective auxiliary edge of the one or more auxiliary edges, a corresponding weight is assigned to the respective auxiliary edge (block 1009). The maximum-weight vertex-disjoint path cover problem is solved for each of the auxiliary trellis graphs (block 1011) to formulate a set of solutions. For each respective solution in the set of solutions, a corresponding total weight is determined (block 1012). An optimal solution is selected from the set of solutions by identifying a largest-weight solution from the set of solutions (block 1013). Alternatively or additionally, other heuristics with a combination of weight re-assignment and enumeration (of a smaller set) can also be applied.

It may be noted that the greedy algorithm of FIG. 4 works only for a single positive constraint. Recall the first three steps of FIG. 4: At block 401, a directed acyclic graph (DAG) is provided comprising a plurality of edges associated with a plurality of vertices, such that each edge of the plurality of edges is associated with a pair of vertices of the plurality of vertices. Next, at block 403, a pair of vertices is identified as being on the same path. The procedure progresses to block 405 where a longest path, pi, between the pair of vertices is identified.

At first glance, it may appear as if the operations of blocks 403-405 could merely be repeated for each individual constraint on a list of positive constraints C1, C2, . . . CN in order to adapt the procedure of FIG. 4 to a multiple positive constraint scenario. However, the reason why one cannot simply repeat blocks 403 and 405 of the above algorithm for the list of positive constraints C1, C2, . . . CN is that, when one chooses a path to satisfy C1, for example, one may have "used up" a vertex that is "the only hope" for any path to satisfy C2.

In the fields of mathematics and computer science, pebble games represent a category of games that are played by moving "pebbles" or "markers" on a directed acyclic graph that includes a plurality of vertices. A pebbling game involves placing pebbles on the vertices of the directed acyclic graph according to certain rules. A given step or turn of the game consists of either placing a pebble on an empty vertex of the graph or removing a pebble from a previously pebbled vertex. Given these basic parameters, a wide variety of different pebble games can be created. Disclosed herein is a novel illustrative pebbles algorithm that can be used to solve a directed acyclic graph when a plurality of positive constraints are to be employed.

Figure 11:
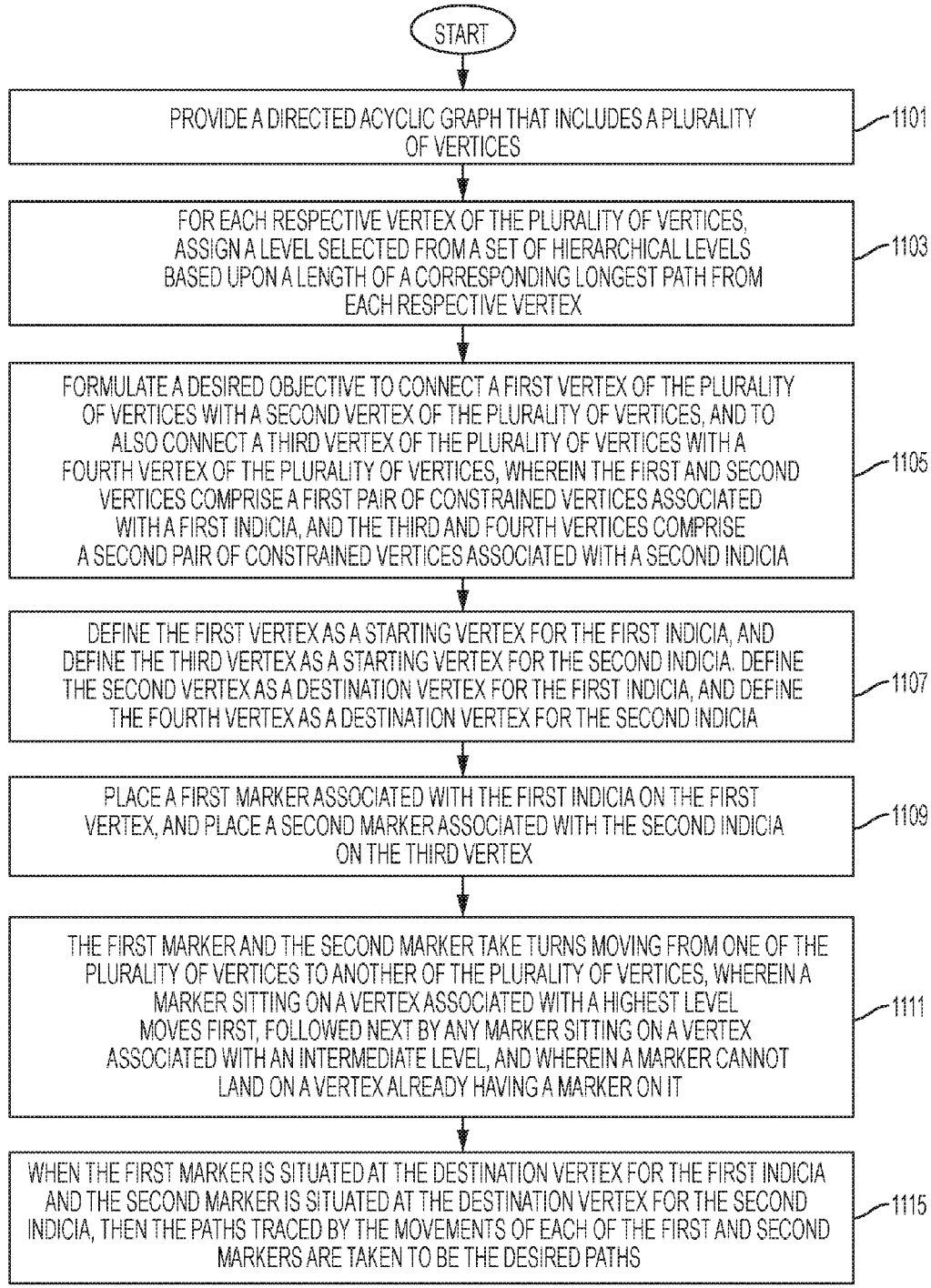
FIG. 11 is a flowchart setting forth an exemplary polynomial time, pebbles-based procedure for solving an object tracking problem using a directed acyclic graph when a plurality of positive constraints are to be employed.
Figure 12:
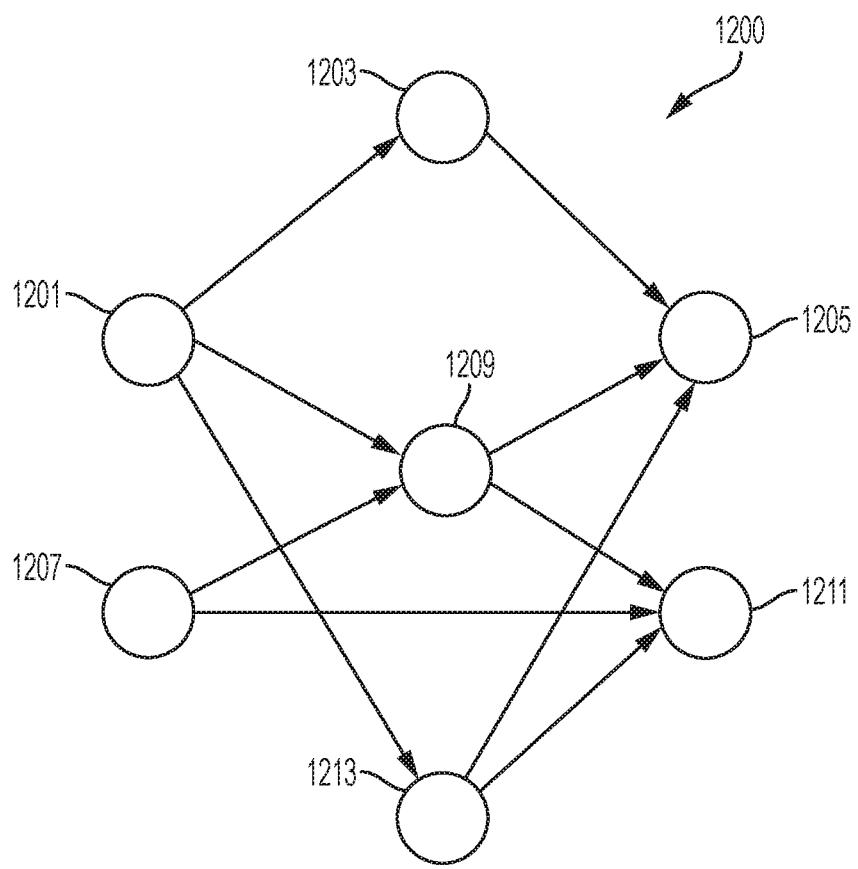
FIG. 12 is an exemplary directed acyclic graph for use with the procedure of FIG. 11.

FIG. 11 is a flowchart setting forth a polynomial time, pebbles-based procedure for solving an object tracking problem using a directed acyclic graph when a plurality of positive constraints are to be employed, and FIG. 12 is an exemplary directed acyclic graph 1200 for use with the procedure of FIG. 11. The graph 1200 (FIG. 12) is solved by finding a set of vertex-disjoint paths that simultaneously connect a set of given pairs of the graph. The pebbles-based procedure commences at block 1101 (FIG. 11) where the directed acyclic graph 1200 (FIG. 12) is provided that includes a plurality of vertices 1201, 1203, 1205, 1207, 1209, 1211, and 1213. Next, for each respective vertex of the plurality of vertices 1201, 1203, 1205, 1207, 1209, 1211, and 1213, a level is assigned to the respective vertex by selecting the level from a set of hierarchical levels based upon a length of a corresponding longest path from each respective vertex (block 1103). For example, vertices 1201 and 1207 (FIG. 12) are assigned to a third level, whereas vertices 1203, 1209, and 1213 are assigned to a second level, and vertices 1205 and 1211 are assigned to a first level. The third level is considered to be a highest level, and the first level is considered to be a lowest level, and the second level is considered to be an intermediate level.

At block 1105 (FIG. 11), a desired objective is formulated to connect a first vertex of the plurality of vertices with a second vertex of the plurality of vertices, and to also connect a third vertex of the plurality of vertices with a fourth vertex of the plurality of vertices, wherein the first and second vertices comprise a first pair of constrained vertices associated with a first indicia, and the third and fourth vertices comprise a second pair of constrained vertices associated with a second indicia. For example, an illustrative desired objective is to connect an upper left vertex 1201 marked with a first color (representing the first vertex) to a lower right vertex 1211 marked with the first color (representing the second vertex), and to connect a lower left vertex 1207 marked with a second color (representing the third vertex) to an upper right vertex 1205 marked with the second color (representing the fourth vertex). For explanatory purposes, assume that the first color is red and the second color is blue. It is apparent that one does not want to make a "red path" by taking a middle vertex 1207 (FIG. 12), because that would prevent the only viable "blue path" from forming.

The solution is to implement the pebbles-based procedure as follows. Each pair of constrained vertices is represented by a color. For example, the upper left vertex 1201 and the lower right vertex 1211 are marked in the first color which, for purposes of illustration, is red. Similarly, the lower left vertex 1207 and the upper right vertex 1205 are marked in the second color which, for purposes of illustration, is blue.

At block 1107 (FIG. 11), the first vertex is defined as a starting vertex for the first indicia, and the third vertex is defined as the starting vertex for the second indicia. The second vertex is defined as a destination vertex for the first indicia, and the fourth vertex is defined as a destination vertex for the second indicia. In the example of FIG. 12, the upper left vertex 1201 is defined as a starting vertex for the first color, red; the lower left vertex 1207 is defined as a starting vertex for the second color, blue; the upper right vertex 1205 is defined as a destination vertex for the second color, blue; and the lower right vertex 1211 is defined as a destination vertex for the first color, red.

Next, at block 1109, a first marker associated with the first indicia is placed on the first vertex, and a second marker associated with the second indicia is placed on the third vertex. Following the example of FIG. 12, a first pebble associated with the first color, red, is placed on the starting vertex 1201 (FIG. 12) for the first color, and a second pebble associated with the second color, blue, is placed on the starting vertex 1207 for the second color.

Then, at block 1111 (FIG. 11), the first marker and the second marker take turns moving from one of the plurality of vertices 1201, 1203, 1205, 1207, 1209, 1211, or 1213 (FIG. 12) to another of the plurality of vertices, subject to the following rules: 1) A marker sitting on a vertex associated with the highest level moves first, followed next by any marker sitting on a vertex associated with the intermediate level. If there are ties, any tie breaking rule may be implemented. 2) A marker cannot land on a vertex already having a marker on it.

The procedure of FIG. 11 is completed when the first marker is situated at the destination vertex for the first indicia and the second marker is situated at the destination vertex for the second indicia. In the example of FIG. 12, the procedure is completed when the first pebble is situated at the destination vertex for the first color (the lower right vertex 1211, FIG. 12), and the second pebble is situated at the destination vertex for the second color (the upper right vertex 1205). When the first marker is situated at the destination vertex for the first indicia and the second marker is situated at the destination vertex for the second indicia, then the paths traced by the movements of each of the first and second markers are taken to be the desired paths (FIG. 11, block 1115). Returning to the example of FIG. 12, once the first pebble and the second pebble are both sitting on their destination vertices 1211, 1205, respectively, then the paths traced by the movements of each of the first and second pebbles are taken to be the desired paths.

A requirement that these paths are vertex disjoint is guaranteed to have been satisfied because, if there were a vertex, say v, that is shared by both a red path and a blue path, then it would mean that the movements of the first and second pebbles must have been as follows: 1) Red's move: A red pebble lands on v. 2) Red's move: The red pebble leaves v. 3) Blue's move: A blue pebble moves from u to v. But the level of u is higher than the level of v since there is a path from u to v. Thus the blue's move in Step 3 above should have taken place before the red's move in Step 2 according to the procedural rules, hence a contradiction.

Let a number of positive constraints k (i.e., a number of paths to connect) be fixed, and measure the complexity of the problem only by a number of vertices n in the graph 1200 (FIG. 12). Then it is evident that the number of configurations of the pebbles-based procedure of FIG. 11 is polynomial in the number of vertices (with an upper bound of nk). Thus, the foregoing pebbles-based procedure is a polynomial time process. In practice, the game tree (as is illustrated, partially, in the graph 1200 of FIG. 12) can be expanded "on-demand" and searched in a depth first or a breadth first fashion. When the graph 1200 is weighted, a set of paths with the maximum weight can be obtained from a full traversal of the same graph 1200.

Figure 13:
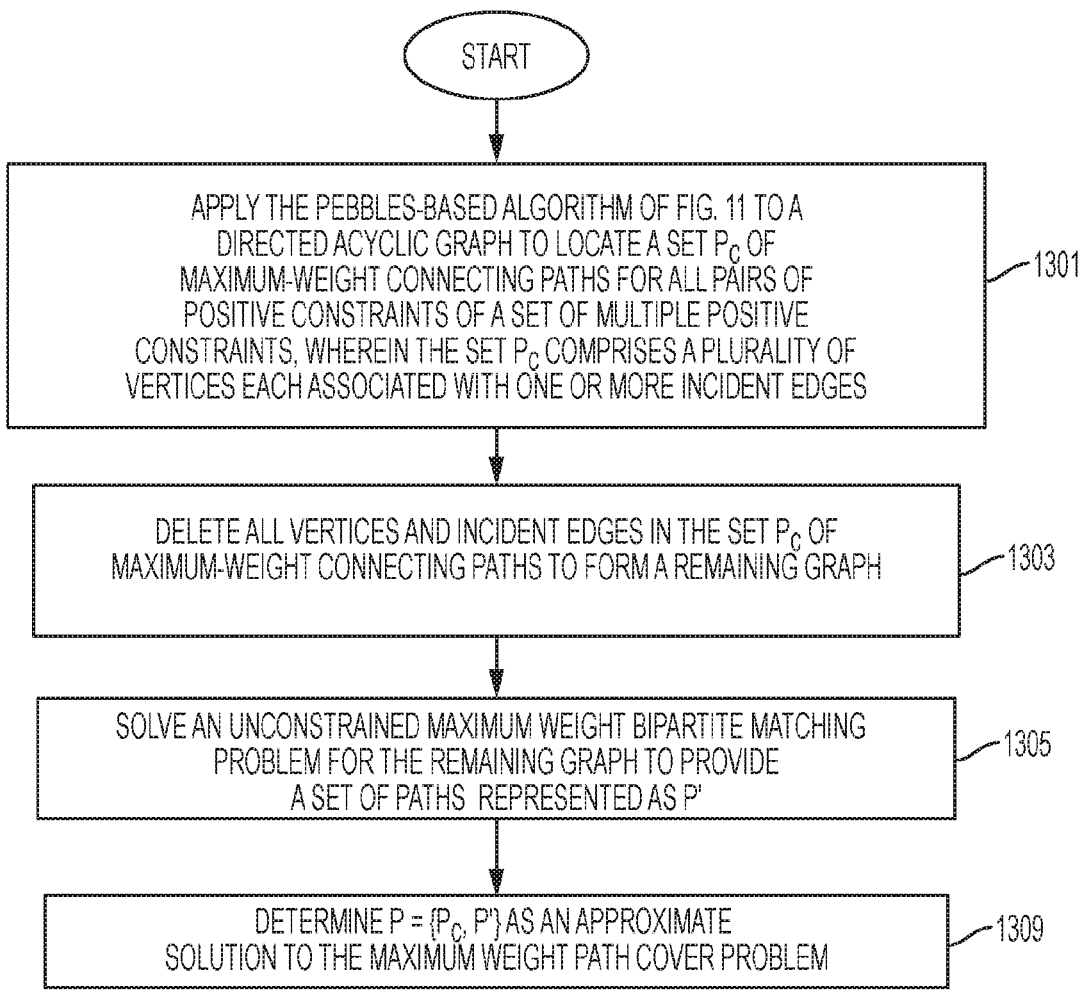
FIG. 13 is flowchart setting forth an illustrative greedy process for solving an object tracking problem by identifying a maximum-weight vertex-disjoint path cover for a plurality of edges using multiple positive constraints.

FIG. 13 is flowchart setting forth an illustrative greedy method for solving an object tracking problem by identifying a maximum-weight vertex-disjoint path cover for a plurality of edges using multiple positive constraints. The method commences at block 1301 where the pebbles-based procedure of FIG. 11 is applied to a directed acyclic graph to find a set Pc of maximum-weight connecting paths for all pairs of positive constraints of the multiple positive constraints. The set $P_c$ comprises a plurality of vertices each associated with one or more incident edges. Next, at block 1303, all vertices on the paths in Pc and their incident edges are deleted from the graph to form a remaining graph. Then, at block 1305, a maximum weight bipartite matching problem, now unconstrained, is solved for the remaining graph to provide a set of paths represented as P̂. Next, at block 1309, P={Pc, P̂} is determined as an approximate solution to the maximum weight path cover problem.

Figure 14:
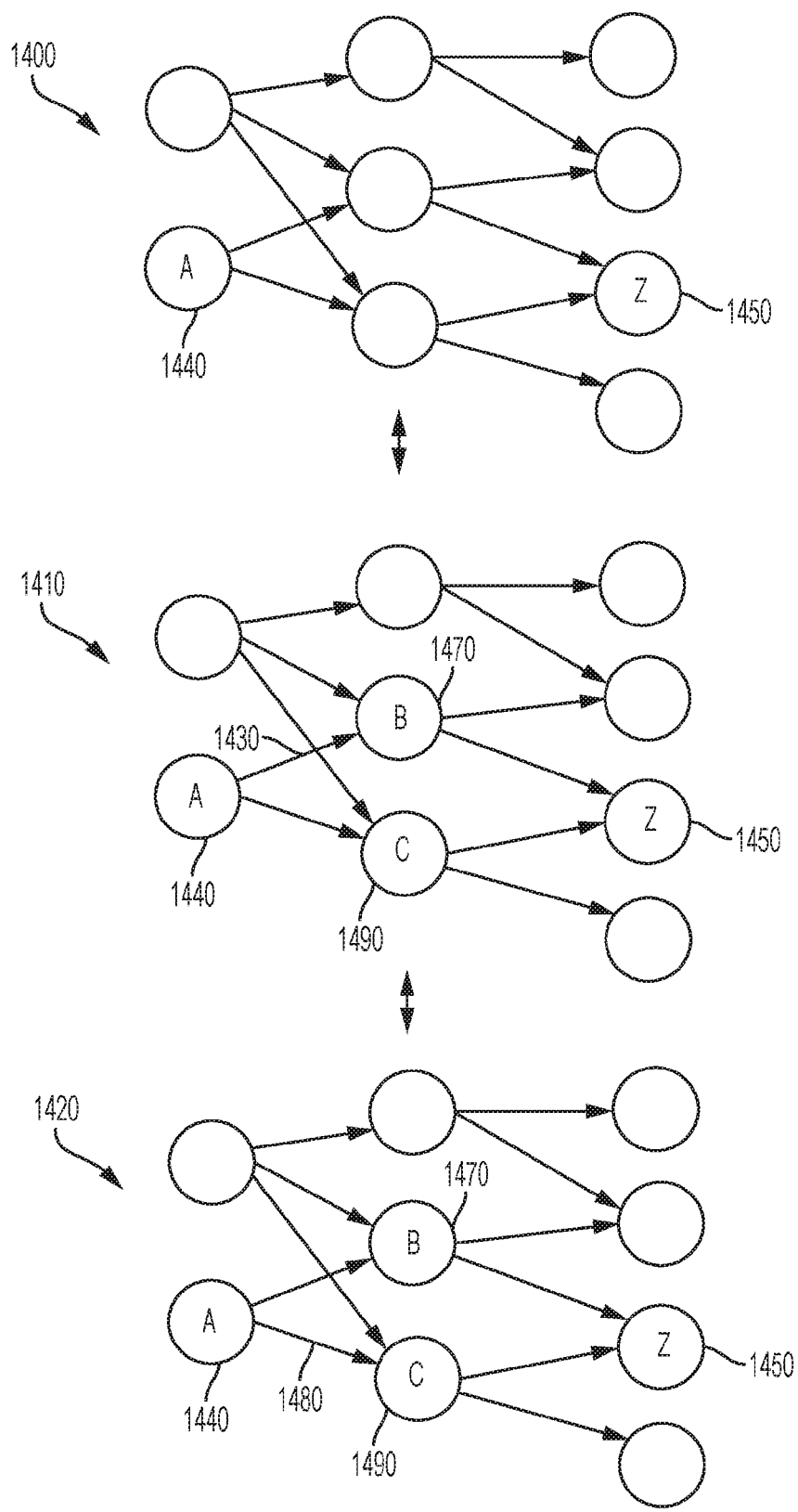
FIG. 14 illustrates a set of exemplary directed acyclic graphs for performing a recursive search procedure for solving an object tracking problem using a single negative constraint for a general DAG.
Figure 15:
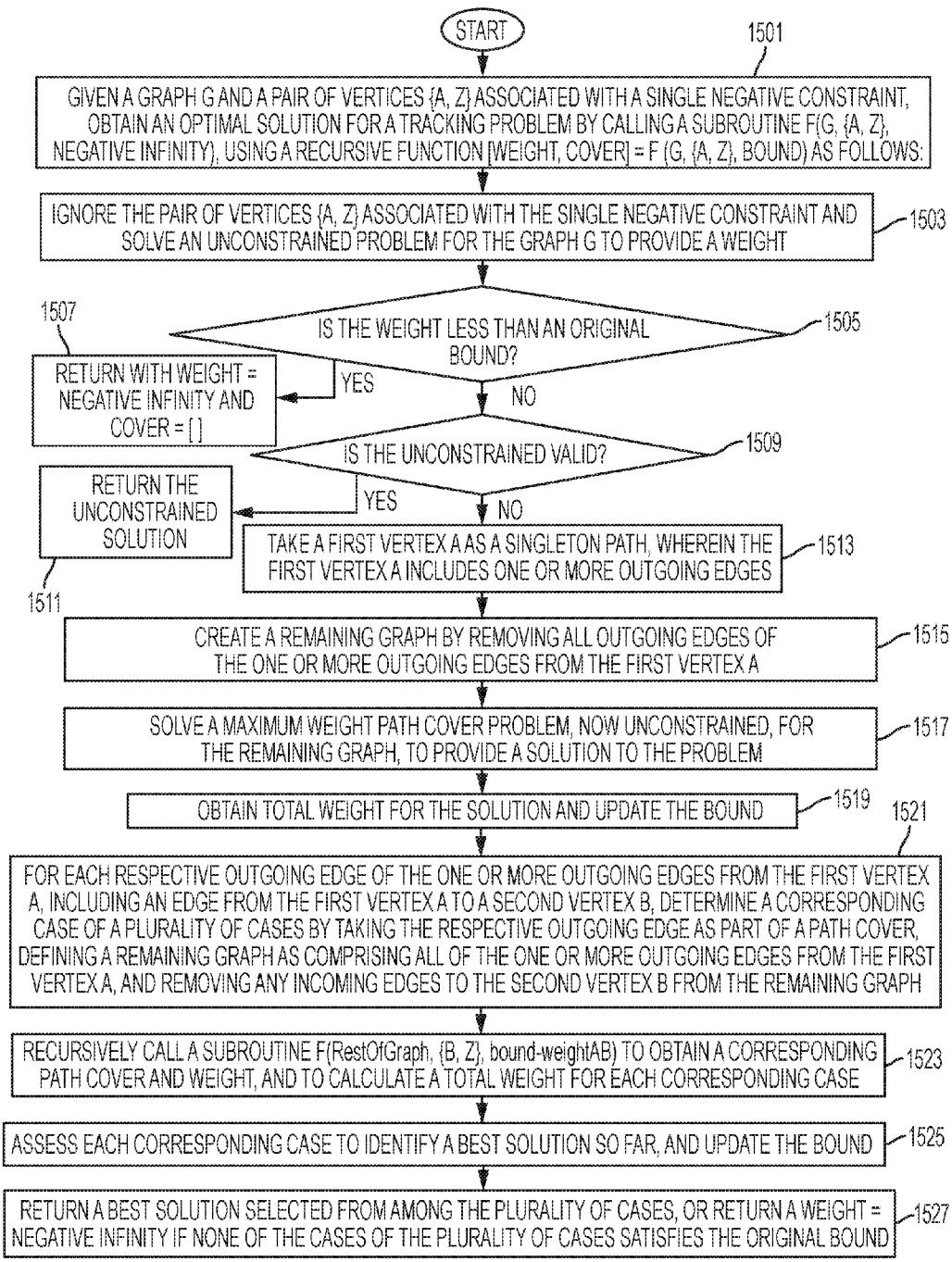
FIG. 15 is a flowchart illustrating an exemplary recursive search procedure for use with the exemplary directed acyclic graphs of FIG. 14.

FIG. 14 illustrates a set of exemplary directed acyclic graphs 1400, 1410, and 1420 for performing a recursive searching procedure using a single negative constraint for a general DAG, and FIG. 15 is a flowchart illustrating an exemplary recursive searching procedure for use with the exemplary directed acyclic graphs 1400, 1410, and 1420 of FIG. 14. First, if one ignores the negative constraint and merely solves the unconstrained problem, then there is a good chance that the solution is actually a valid one, i.e., it satisfies the negative constraint already. This is because a given pair of vertices of a directed acyclic graph are typically not on the same path in an unconstrained maximum weight path cover solution, in contrast to the situation with a positive constraint.

FIG. 14 illustrates any of the three possible cases for obtaining a maximum weight as an optimal solution. First consider the directed acyclic graph 1400: If a pair of vertices {A, Z} 1440, 1450, respectively, are associated with a negative constraint, then any solution with A 1440 being a singleton path is a valid solution because A 1440 is not connected to Z 1450. Thus, take A 1440 as a singleton and solve the remainder of the graph 1400 as an unconstrained problem. Next, consider the directed acyclic graph 1410. Take a first path A->B 1430 and recursively solve a remaining portion of the acyclic graph 1410 with {B, Z} 1470, 1450, respectively, representing a pair associated with the negative constraint. Similarly, with respect to the directed acyclic graph 1420, take a second path A->C 1480 and recursively solve a remaining portion of the graph 1420 with {C, Z} 1490, 1450, respectively, representing a pair associated with the negative constraint. One of the foregoing three cases with the maximum weight is the optimal solution. Because we can always get a valid solution from a singleton such as A 1440, one can set up a lower bound on the maximum weight solution, and update this bound as the recursion progresses.

FIG. 15 is a flowchart illustrating an exemplary recursive searching procedure for solving an object tracking problem when a single negative constraint is to be used for a general DAG. The procedure commences at block 1501 where, given a graph G and a pair of vertices {A, Z} associated with a single negative constraint, an optimal solution is obtained by calling a subroutine F(G, {A, Z}, -Inf), where a recursive function [weight, cover]=F(graph, pair, bound) is described as follows. At block 1503, ignore the pair of vertices {A, Z} associated with the single negative constraint and solve an unconstrained problem for the graph G to provide a weight. Next, at block 1505, a test is performed to ascertain whether or not the weight is less than a bound. If the weight is less than the bound, return with weight=-Inf and cover=[ ] at block 1507. If the weight is not less than the bound, then a test is performed to ascertain whether or not the unconstrained solution is valid at block 1509. If the unconstrained solution is valid, this solution is returned at block 1511.

If the unconstrained solution is not valid, then the program progresses to block 1513 where a first vertex A is taken as a singleton path. At block 1515, a remaining graph is created by removing all outgoing arcs from the first vertex A. Then, at block 1517, the maximum weight path cover problem, which is now unconstrained, is solved. The total weight is obtained and the bound is updated (block 1519). Next (block 1521), for each of the outgoing arcs from the first vertex A, including an arc from the first vertex A to a second vertex B, A->B with weight AB, take these outgoing arcs as part of a path cover, let the remaining graph be the graph with the outgoing arcs from the first vertex A, and remove the incoming arcs to the second vertex B. At block 1523, call recursively a subroutine F(restOfGraph, {B, Z}, bound-weightAB) to obtain a corresponding path cover and weight, and calculate the total weight for this case. Then record the best solution so far (block 1525) and update the bound. Return the best solution from the foregoing cases (block 1527), or return a weight=-Inf if none of the cases satisfies the original bound.

In the method of FIG. 15, an enumeration of cases is performed using the outgoing arcs of the first vertex A. This can be done by using the incoming arcs of Z instead, or by enumerating combinations of the two. The order of search can also be chosen heuristically so as to raise the bound more quickly and eliminate unnecessary recursions.

An exemplary method for solving an object tracking problem using a single negative constraint on a trellis may be formulated as follows. When a number of constraints is fixed and complexity increases as a function of graph size, constrained path problems may be difficult to solve. It is currently it is not known how difficult it may be to solve constrained path cover problems. For a trellis graph G(V,A), a vertex set V can be divided into disjoint subsets, called stages, of vertices {Vi}, i=1, 2, . . . N, such that any arc $\alpha = v_i v_j$ is between two adjacent stages, i.e., there is an index t such that $v_i \in V_t$ and $v_j \in V_{t+1}$.

Returning to FIG. 5, consider the subgraph Gi 550 formed by arcs between two adjacent stages and their associated vertices. Recall that the local matching $M_i$ was associated with the subgraph $G_i$ 550. It is apparent that the entire bipartite trellis graph 500 G is a union of a plurality of subgraphs including subgraph $G_i$ 550, and a union of the "local" matchings Mi always forms a valid matching M for the whole graph G. It is this property that will be exploited in constructing an efficient algorithm for solving the single negative constraint path cover problem.

Figure 16:
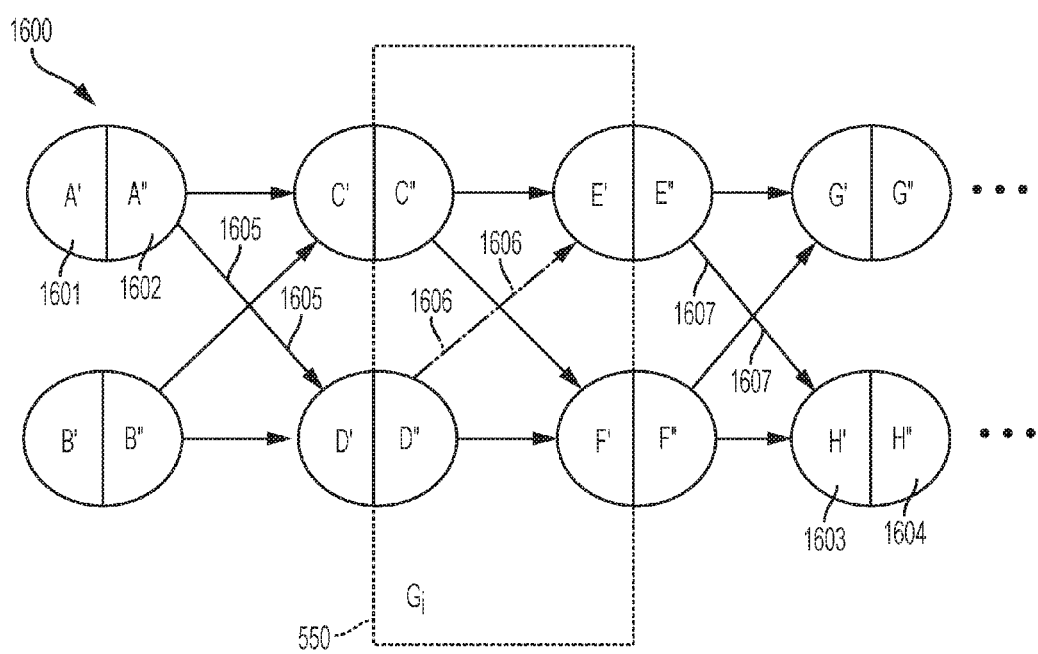
FIG. 16 is a second exemplary trellis graph that has been processed to generate a bipartite trellis graph by splitting each vertex.

FIG. 16 is a second exemplary trellis graph 1600 that has been processed to generate a bipartite trellis graph by splitting each vertex into a first portion and a second portion. For example, a vertex A includes a first portion A' 1601 and a second portion A" 1602. Likewise, a vertex H includes a first portion H' 1603 and a second portion H" 1604. Let the vertex A and the vertex H denote a pair of vertices associated with the negative constraint. Consider a case when an unconstrained maximum weight path cover, $P^*_{uc}$, does not satisfies the negative constraint. In other words, there is a path, path $P_{a\_h} \in 2\, P^*_{uc}$, that connects vertex A to vertex H. This path $P_{a\_h}$ is comprised of a set of path segments, edges, or arcs 1605, 1606, and 1607.

Now consider an optimal constrained solution P*. There has to be at least one arc on the path $P_{a\_h}$ that is absent from all paths in P* (hereinafter termed the "absent arc"), as otherwise P* would not be valid. In fact, there is only one such arc, as denoted by the arc 1606, in the subgraph $G_i$ 550. To see this, let the unconstrained maximum weight path cover $P^*_{uc}$ consist of a set of local matchings $\{M_j^{*uc}\}$ for the set of subgraphs $\{G_j\}$, j=1, . . . , K−1 with K representing a number of stages. This set of subgraphs includes the subgraph $G_i$ 550. Similarly, let P* consist of local matchings $\{M_j^*\}$. If the absent arc is in $G_i$, then for j not equal to i, $M_j^{*uc}=M_j^*$, i.e., the optimal local matchings are the same for both constrained and unconstrained solutions except for $G_i$. The proof is outlined as follows:

For any j not equal to i, swapping $M_j^*$ with $M_j^{*uc}$ leads to another valid global bipartite matching that increases the total weight of the path cover, if the two are not already identical. This is due to the structure of a trellis.

B. When $M_j^{*uc}=M_j^*$ for all j not equal to i, all the arcs 1605 and 1607 in the path $P_{a\_h}$ are present except for the arc 1606 in $G_i$ 550, by assumption.

C. Let $M_i^{*cut}$ be a maximum weight bipartite matching for $G_i\backslash\{d"\rightarrow e'\}$, i.e., with the arc 1606 removed from the subgraph $G_i$ 550. Then $\{M_1^{*uc}, \ldots, M_{i-1}^{*uc}, M_i^{*cut}, M_{i+1}^{*uc}, M_{K-1}^{*uc}\}$ forms a path cover that both satisfies the negative constraint and achieves maximum weight.

D. It is further concluded that the subgraph $G_i$ 550 that contains the arc 1606 is the one with the smallest drop in total weight from $M_i^{*uc}$ to $M_i^{*cut}$. This conclusion leads to a trellis algorithm for a single negative constraint.

Figure 17:
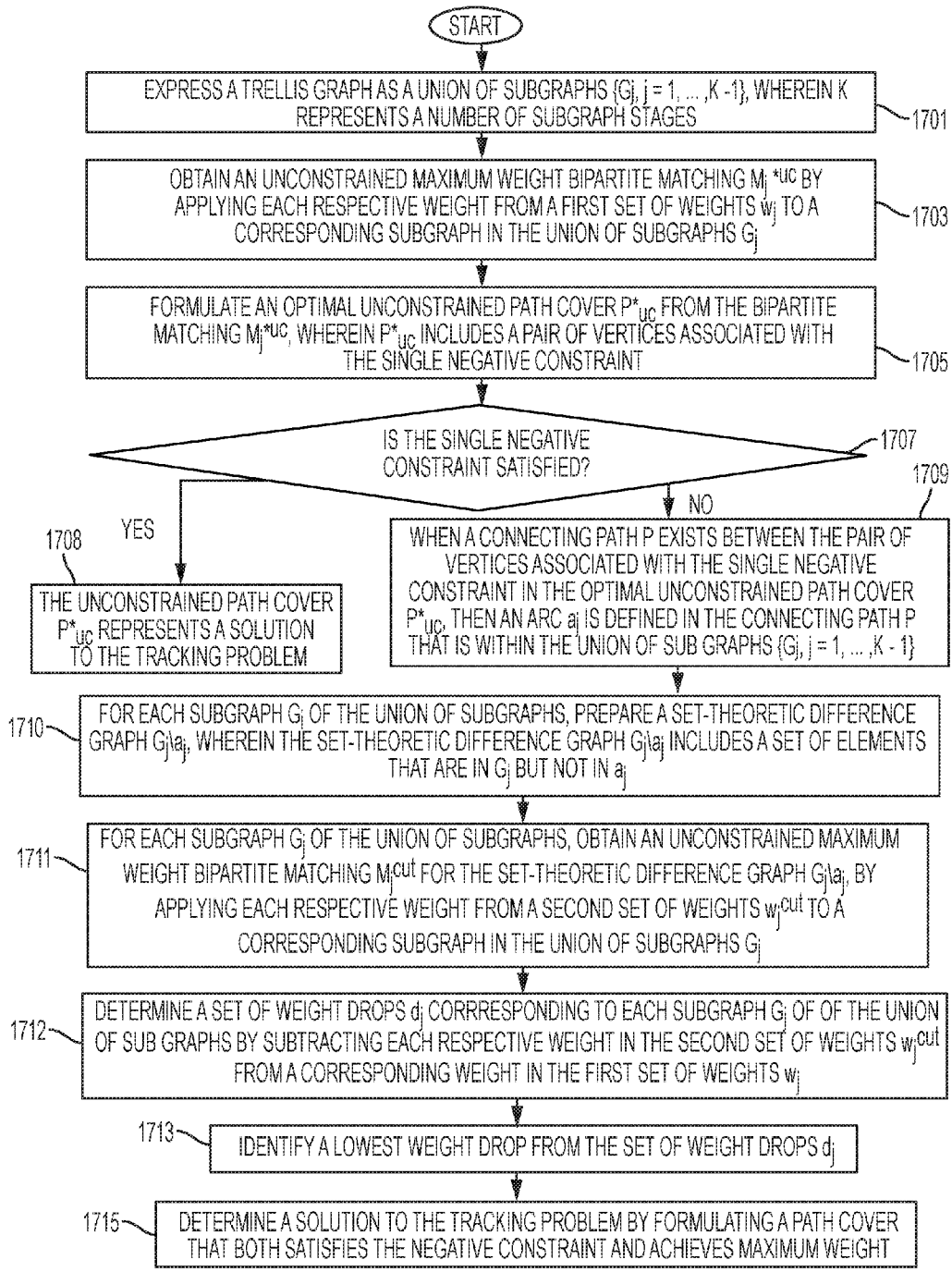
FIG. 17 is a flowchart setting forth an illustrative trellis-based procedure for solving an object tracking problem by identifying a maximum-weight vertex-disjoint path cover for a plurality of edges using a single negative constraint.

FIG. 17 is a flowchart setting forth an illustrative trellis-based procedure for solving an object tracking problem by identifying a maximum-weight vertex-disjoint path cover for a plurality of edges using a single negative constraint. The procedure of FIG. 17 commences at block 1701 where a trellis graph is expressed as a union of subgraphs $\{G_j, j=1, \ldots, K-1\}$ with K representing a number of subgraph stages, as previously illustrated in FIG. 5. Next, at block 1703 (FIG. 17), an unconstrained maximum weight bipartite matching $M_j^{*uc*}$ is obtained by applying each respective weight from a first set of weights $w_j$ to a corresponding subgraph in the union of subgraphs Gj. An optimal unconstrained path cover $P^*_{uc}$ is then formulated from the bipartite matching $M_j^{*uc*}$ (block 1705), wherein $P^*_{uc}$ includes a pair of vertices associated with the single negative constraint. A test is performed at block 1707 to ascertain whether or not the single negative constraint is satisfied. If so, the optimal unconstrained path cover $P^*_{uc}$ represents a solution to the tracking problem (block 1708).

The negative branch from block 1707 leads to block 1709. When there is a connecting path P between the pair of vertices associated with the single negative constraint in the optimal unconstrained path cover $P^*_{uc}$, then an arc $a_j$ is defined in the connecting path P that is within the union of subgraphs $\{G_j, j=1, \ldots, K-1\}$. For each subgraph $G_j$ of the union of subgraphs, a set-theoretic difference graph $G_j\backslash a_j$ is prepared, wherein the set-theoretic difference graph $G_j\backslash a_j$ includes a set of elements that are in $G_j$ but not in $a_j$ (block 1710). For each subgraph $G_j$ of the union of subgraphs, an unconstrained maximum weight bipartite matching $M_j^{*cut}$ for the set-theoretic difference graph $G_j\backslash a_j$ is obtained by applying each respective weight from a second set of weights $w_j^{cut}$ to a corresponding subgraph in the union of subgraphs Gj (block 1711). Next, a set of weight drops $d_j$ corresponding to each subgraph $G_j$ of the union of subgraphs is determined by subtracting each respective weight in the second set of weights $w_j^{cut}$ from a corresponding weight in the first set of weights $w_j$ (block 1713). A lowest weight drop is identified from the set of weight drops $d_j$ (block 1715). A solution to the tracking problem is then determined by formulating a path cover that both satisfies the negative constraint and achieves maximum weight. Illustratively, the path cover may be formulated in accordance with a matching equation $\{M_1^*{}_{uc}, \ldots, M_{i-1}^{*uc}, M_i^{*cut}, M_{i+1}^{*uc}, M_{K-1}^{*uc}\}$.

The bulk of computation for the procedure of FIG. 17 is in solving for the maximum weight bipartite matching for subgraphs a total of 2K times where K is the number of stages of subgraphs. Each solution takes polynomial cubic time in the number of vertices per stage. Thus, the method of FIG. 17 is efficient.

Numerical evaluations: Two experiments were conducted to evaluate the recursive searching methods of FIGS. 14 and 15, and the trellis-based procedure of FIG. 17. In a first experiment, 10,000 random DAG's were generated, each having 50 vertices and 625 randomly selected arcs with weights uniformly distributed between −1 and 1. The first and last numbered vertices were chosen to be the pair for the negative constraint. Since the most expensive part of the computation is the call to obtain the maximum weight bipartite matching, the number of such calls is used as a proxy for the depth of recursion and the run time of the solution.

Figure 18:
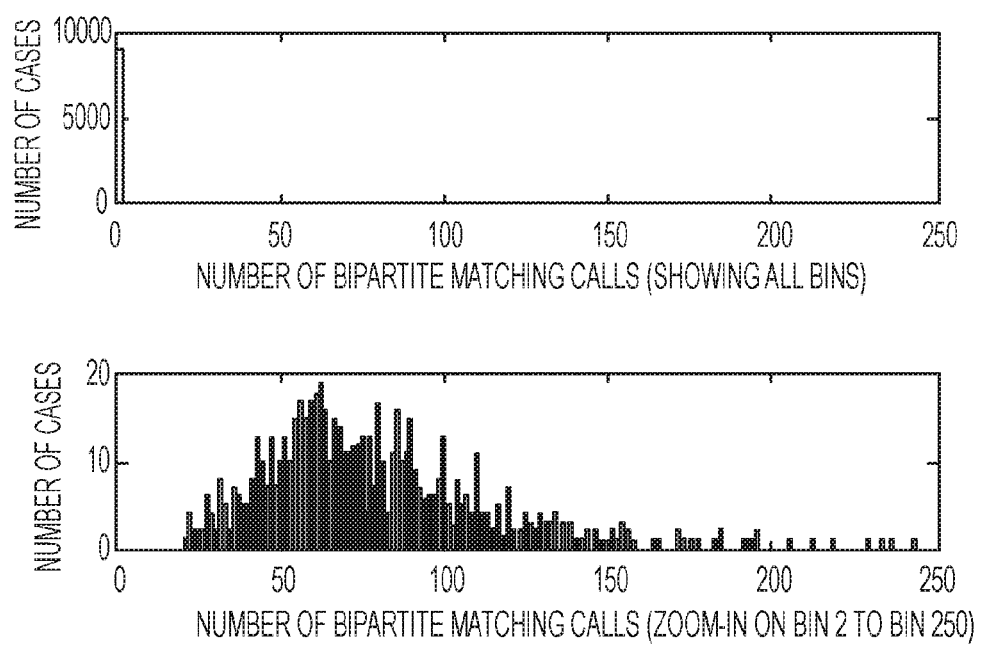
FIG. 18 is a histogram showing number of cases versus number of bipartite matching calls for an illustrative search procedure.

FIG. 18 is a histogram showing number of cases versus number of bipartite matching calls for an illustrative searching procedure for solving an object tracking problem pursuant to the foregoing example of 10,000 random DAG's. As is expected, in most cases, the unconstrained optimal solution turns out to satisfy the constraint that the first vertex and the last vertex are not on the same path; this is shown in the upper subplot. After such cases are excluded, the "zoomed-in" histogram is shown in the lower subplot, where one can see a heavy tail distribution.

In a second experiment, random trellis graphs were generated. Both the searching method and the trellis-based procedure were performed on each randomly generated graph. More specifically, the number of vertices on each stage was fixed at m=20, and the number of stages in the graph was varied from N=11 to N=30. For each configuration (m;N), 1,000 Monte Carlo runs were conducted, where in each run a random trellis is generated with half of all possible arcs randomly chosen to be present and assigned weights uniformly distributed between −1 and 1. One takes the pair of the first and the last vertices to be the negative constraint, and obtains the optimal solution using the searching procedure and the trellis-based method, respectively. The ratio of the two run times is taken to be the normalized run time for the searching procedure. The worst ratio among the 1,000 runs was recorded for each configuration of (m;N). The first thing to report is that the two algorithms produce identical path covers for each trellis.

Figure 19:
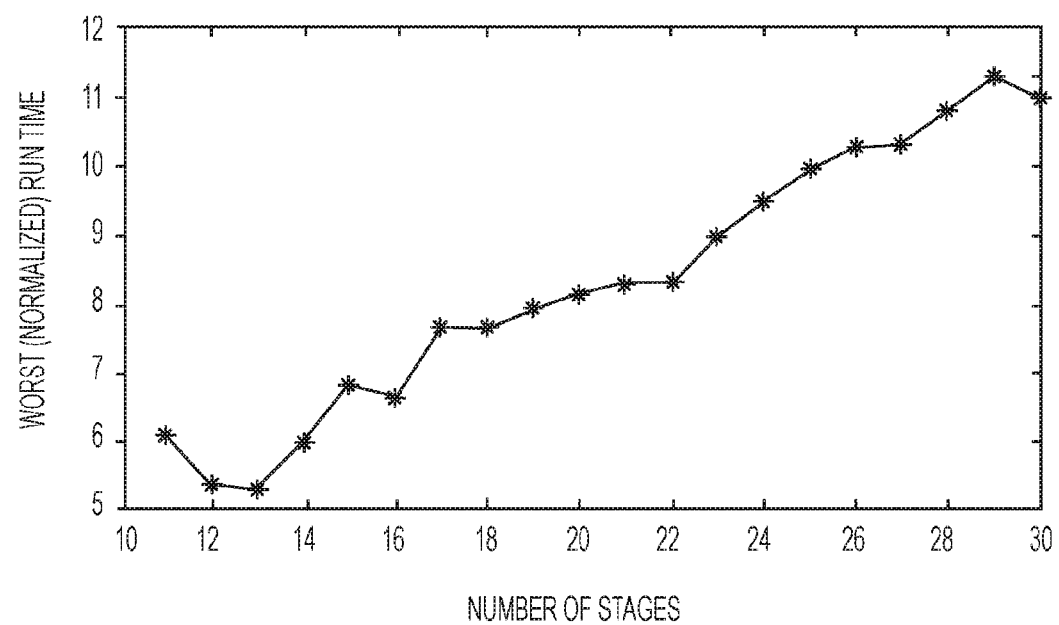
FIG. 19 is a graph showing worst normalized run time versus number of stages for the search procedure of FIG. 18.

FIG. 19 is a graph showing worst normalized run time versus number of stages for the searching procedures of FIGS. 14 and 15. The graph of FIG. 19 reveals that, by exploiting the trellis structure, run time can be significantly reduced as the number of stages grows larger.

Although the foregoing sets of embodiments disclosed herein relate to solving object tracking problems, it may be noted that a broad range of practical problems can be represented using graphs. The graphs discussed herein with reference to FIGS. 1-17 may be used to model many types of relations and processes in the physical, biological, social, electronic, and computer science domains. Graphs can be used to represent communication networks, data organization, information systems, storage devices, computational devices, and/or the flow of computation. For instance, a link structure of a website can be represented by a directed graph, in which the vertices represent web pages and directed edges represent links from one page to another. A similar approach can be utilized to solve problems in travel, biology, computer chip design, and many other fields.

The development of methods for solving graphs is of major interest in computer science. A transformation of graphs is often formalized and represented by graph rewrite systems. Complementary to graph transformation systems focusing on rule-based in-memory manipulation of graphs are graph databases geared towards transaction-safe, persistent storing and querying of graph-structured data.

Graph-theoretic methods have proven particularly useful in linguistics, since natural language often lends itself well to discrete structure. Traditionally, syntax and compositional semantics follow tree-based structures, whose expressive power lies in the principle of compositionality, modeled in a hierarchical graph. More contemporary approaches such as head-driven phrase structure grammar model the syntax of natural language using typed feature structures, which can be represented using directed acyclic graphs. Within lexical semantics, especially as applied to computers, modeling word meaning is easier when a given word is understood in terms of related words; semantic networks are therefore important in computational linguistics. Still other methods in phonology (e.g. optimality theory, which uses lattice graphs) and morphology (e.g. finite-state morphology, using finite-state transducers) are common in the analysis of language as a graph.

Graph theory has proven useful in the design of integrated circuits (ICs) for computers and other electronic devices. These components, more often called chips, contain complex, layered microcircuits that can be represented as sets of points interconnected by lines or arcs. Using graph theory, engineers develop chips with maximum component density and minimum total interconnecting conductor length. This is important for optimizing processing speed and electrical efficiency.

Graph theory is also used to study molecules in chemistry and physics. In condensed matter physics, the three-dimensional structure of complicated simulated atomic structures can be studied quantitatively by gathering statistics on graph-theoretic properties related to the topology of the atoms. In the field of chemistry, a graph provides a natural model for a molecule, where vertices represent atoms and edges represent bonds. This approach is especially used in computer processing of molecular structures, ranging from chemical editors to database searching. In statistical physics, graphs can represent local connections between interacting parts of a system, as well as the dynamics of a physical process on such systems. Similarly, in computational neuroscience, graphs can be used to represent functional connections between brain areas that interact to give rise to various cognitive processes, where the vertices represent different areas of the brain and the edges represent the connections between those areas. Graphs are also used to represent the micro-scale channels of porous media, in which the vertices represent the pores and the edges represent the smaller channels connecting the pores.

Graph theory is also widely used in sociology to measure an individual's level of prestige and to explore rumor spreading, notably through the use of social network analysis software. Many different types of graphs may be utilized in the context of social networks. For example, acquaintanceship and friendship graphs may be used to model the existence or lack of a relationship between each of a plurality of individuals. Influence graphs model whether certain people can influence the behavior of others. Finally, collaboration graphs model whether two people work together in a particular way, such as acting in a movie together.

Likewise, graph theory is useful in biology and conservation efforts where a vertex can represent regions where certain species exist (or inhabit) and the edges represent migration paths, or movement between the regions. This information is important when looking at breeding patterns or tracking the spread of disease, parasites or how changes in the movement of one species can affect other species.

A graph structure can be extended by assigning a weight to each edge of the graph. Graphs with weights, or weighted graphs, are used to represent structures in which pairwise connections have some numerical values. For example, if a graph represents a road network, the weights could represent the length of each road. In mathematics, graphs are useful in geometry and certain parts of topology such as knot theory. Algebraic graph theory has close links with group theory.

Figure 20:
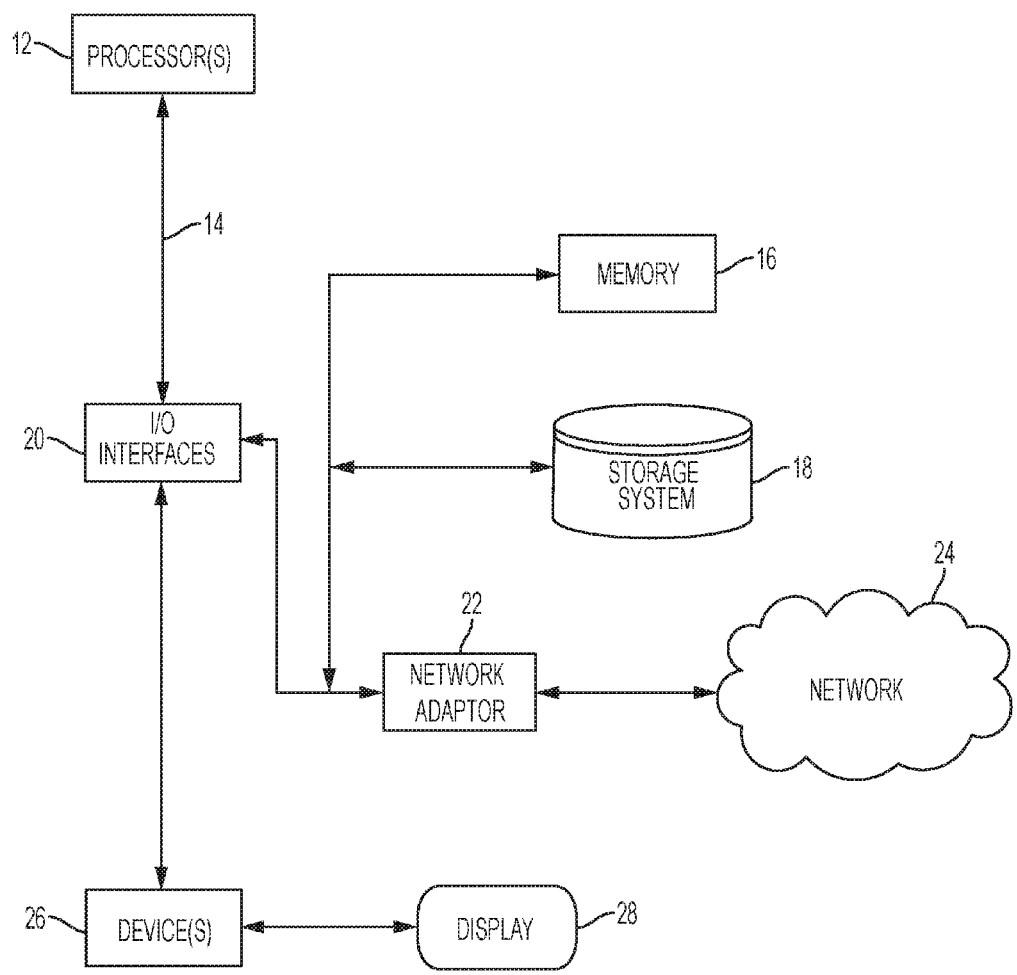
FIG. 20 illustrates a schematic of an exemplary computer or processing system that may implement any of the methods of FIG. 4, 7A, 7B, 10, 11, or 13-17 for solving an object tracking problem, in one set of embodiments of the present disclosure.

FIG. 20 illustrates a schematic of an exemplary computer or processing system that may implement any of the methods of FIG. 4, 7A, 7B, 10, 11, or 13-17, in one set of embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 20 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. The computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Those skilled in the art will appreciate that Graph Base Tracking offers the advantage of decoupling data representation from data inference, and is better suited for handling large data sets as compared to MHT. Under certain path independence condition, which usually holds for kinematics obtained with modern sensors, the inference problem can be transformed into one of finding the maximum weight path cover, which can be solved efficiently. However, with long term attribute information, path independence no longer holds, and research is being carried out to find efficient algorithms to solve such problems. Considered herein are some special cases of attribute-induced hard constraints such as a single positive constraint, a single negative constraint, and multiple positive constraints. One such exemplary constraint is, that a given pair of measurements/tracklets are known to be from the same target and therefore should be in the same track in the tracking solution. The graph theoretic problem is described herein as a problem of constrained maximum weight path cover. A conjecture was made about the computational complexity of this problem, and an efficient optimal algorithm was presented for a subclass of graphs with trellis structures. It is also indicated how such an algorithm can be used in a search procedure for the general case. For example, one may assumed herein that the only information extracted and used from the attribute information is a hard constraint that defines the validity of a path. In more general cases, the constraint can be "soft" in the sense that attribute can evolve and its measurement is probabilistic, e.g., red color can look brownish under a different lighting. While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A computer-implemented method for solving an object tracking problem, the method comprising:
  gathering, with one or more cameras, a sequence of image frames of one or more objects from a scene;
  processing, with one or more processors, the gathered sequence of image frames to construct a directed acyclic graph from the one or more objects in the sequence of image frames, the directed acyclic graph comprising a plurality of vertices each connected by one or more arcs, wherein each respective vertex of the plurality of vertices corresponds to an object of the one or more objects in an image frame of the sequence of image frames;

implementing a single positive constraint by identifying a pair of vertices of the plurality of vertices as being on a substantially identical path;

identifying a longest path between the pair of vertices;

deleting all vertices on the longest path from the directed acyclic graph, and deleting all incident arcs associated with the deleted vertices from the directed acyclic graph, to generate a simplified directed acyclic graph; and solving the object tracking problem, with the one or more processors, by applying a maximum weight bipartite matching procedure to the simplified directed acyclic graph to determine a most likely track for the one or more objects in the sequence of image frames.

2. The method of claim 1 further comprising solving the object tracking problem with the one or more processors by:

splitting each respective vertex of the plurality of vertices of the simplified directed acyclic graph into a corresponding set comprising a first connected vertex and a second connected vertex, each respective vertex having at least one in-arc, or at least one out-arc, or at least one in-arc and at least one out-arc, such that each in-arc of each respective vertex is directed into the first connected vertex of the corresponding set, and such that each out-arc of each respective vertex is directed out of the second connected vertex of the corresponding set;

incorporating each corresponding set of first and second connected vertices into the simplified directed acyclic graph to generate a bipartite companion graph;

applying the maximum weight bipartite matching procedure to the bipartite companion graph to provide a plurality of arcs that are assembled into a set of paths.

3. The method of claim 2 wherein the one or more processors determine an assembly of the plurality of arcs into a set of paths in accordance with:

$$\mathcal{P}^* = \underset{\mathcal{P}}{\mathrm{argmax}} \sum_{p \in \mathcal{P}} \sum_{e \in p} \omega(e)$$

where P* represents a best path cover, p represents a path, and w(e) represents a weight on an arc of the bipartite companion graph.

4. The method of claim 3 further comprising the one or more processors:

defining the set of paths as $P^{--}$; and determining a solution P for a maximum weight vertex-disjoint path cover problem using an equation $P=\{p_L, P^{--}\}$ where $p_L$ represents the longest path, and the solution P comprises the most likely track for each of the one or more objects in the sequence of image frames.

5. A computer-implemented method for solving an object tracking problem, the method comprising:

gathering, with one or more cameras, a sequence of image frames of one or more objects from a scene;

processing, with one or more processors, the gathered sequence of image frames to construct a trellis graph from the one or more objects in the sequence of image frames, the trellis graph comprising a plurality of vertices each connected by one or more arcs, wherein each respective vertex of the plurality of vertices corresponds to an object of the one or more objects in an image frame of the sequence of image frames;

applying a single positive constraint to a first vertex and a second vertex of the plurality of vertices, wherein the first vertex and the second vertex are constrained to be a same-track pair included in a substantially identical path;

performing a forward sweep to identify a set of one or more vertices of the plurality of vertices in the trellis graph that are reachable from the first vertex;

associating the identified set of one or more vertices with a first identifier;

performing a backward sweep through the set of one or more vertices associated with the first identifier to identify a subset of vertices that reach the second vertex;

constructing an auxiliary graph with the first vertex, the second vertex, and the subset of vertices that are associated with the second identifier, wherein the auxiliary graph includes a plurality of vertices and at least one respective arc associated with a corresponding first weight; and solving the object tracking problem, with the one or more processors, to determine a most likely track for each of the one or more objects in the sequence of image frames, by constructing a companion bipartite graph from the auxiliary graph by splitting each respective vertex of the plurality of vertices in the auxiliary graph, including the first vertex and the second vertex, into a corresponding first vertex portion connected to a corresponding second vertex portion, wherein each corresponding first vertex portion is connected to zero or more incoming arcs, and each corresponding second vertex portion is connected to zero or more outgoing arcs.

6. The method of claim 5 wherein, for the at least one respective arc of the auxiliary graph, the one or more processors identifies a corresponding arc from the second vertex portion of the first vertex to the first vertex portion of the second vertex in the companion bipartite graph, wherein the corresponding arc is associated with one or more incident arcs.

7. The method of claim 6 further comprising:

identifying, with the one or more processors, a subgraph of the companion bipartite graph containing the corresponding arc;

deleting the corresponding arc, and the one or more incident arcs associated with the corresponding arc, from the identified subgraph to generate a remaining graph from the identified subgraph;

determining a maximum weight bipartite matching for the remaining graph;

determining an optimal weight for the at least one arc in the auxiliary graph, wherein the optimal weight comprises a second weight;

generating a sum of the first weight and the second weight;

assigning the sum to the at least one arc in the auxiliary graph; and determining a longest path using the auxiliary graph, wherein the longest path is included in a best global solution for a maximum weight vertex-disjoint path cover problem, and the best global solution comprises the most likely track for each of the one or more objects in the sequence of image frames.

8. A computer-implemented method for solving an object tracking problem using a searching procedure, the method comprising:

gathering, with one or more cameras, a sequence of image frames of one or more objects from a scene;

processing, with one or more processors, the gathered sequence of image frames to construct a trellis graph from the one or more objects in the sequence of image frames, the trellis graph comprising a plurality of vertices each connected by one or more arcs, wherein each respective vertex of the plurality of vertices corresponds to an object of the one or more objects in an image frame of the sequence of image frames; the trellis graph including a plurality of temporally related stages including at least a first stage representing a first time window, a second stage representing a second time window, and a third stage representing a third time window, wherein the first stage is immediately adjacent to the second stage, and the third stage is not immediately adjacent to the first stage;

analyzing the trellis graph, with the one or more processors, to identify each of one or more violating arcs that skip over the second stage from the first stage to the third stage, wherein the second stage comprises a skipped-over stage;

for each respective arc of the one or more violating arcs, identifying a presence or an absence of the respective arc in an optimal solution comprising a corresponding configuration for the respective arc;

for each corresponding configuration, constructing an auxiliary trellis graph by adding an auxiliary vertex and one or more auxiliary arcs for each of one or more skipped-over stage including the second stage;

for each respective auxiliary arc of the one or more auxiliary arcs, assigning a corresponding weight to the respective auxiliary arc; and solving the object tracking problem, with the one or more processors, to determine a most likely track for each of the one or more objects in the sequence of image frames, by solving a maximum weight vertex-disjoint path cover problem for each of the auxiliary trellis graphs to formulate a set of solutions.

9. The method of claim 8 wherein the one or more processors are further configured for determining a corresponding total weight for each respective solution in the set of solutions.

10. The method of claim 9 wherein the one or more processors are further configured for selecting an optimal solution from the set of solutions by identifying a largest-weight solution from the set of solutions.

11. A computer-implemented method for solving an object tracking problem with a plurality of positive constraints, the method comprising:

gathering, with one or more cameras, a sequence of image frames of one or more objects from a scene;

processing, with one or more processors, the gathered sequence of image frames to construct a directed acyclic graph that includes a plurality of vertices;

for each respective vertex of the plurality of vertices, the one or more processors assigning a level selected from a set of hierarchical levels based upon a length of a corresponding longest path from each respective vertex;

the one or more processors determining a solution for connecting a first vertex of the plurality of vertices with a second vertex of the plurality of vertices, and also for connecting a third vertex of the plurality of vertices with a fourth vertex of the plurality of vertices, wherein the first and second vertices comprise a first set of vertices associated with a first indicia, and the third and fourth vertices comprise a second set of vertices associated with a second indicia;

defining the first vertex as a starting vertex for the first indicia, and defining the third vertex as a starting vertex for the second indicia;

defining the second vertex as a destination vertex for the first indicia, and defining the fourth vertex as a destination vertex for the second indicia;

placing a marker associated with the first indicia on the first vertex, and placing a marker associated with the second indicia on the third vertex;

alternately guiding the first marker and the second marker to move from one of the plurality of vertices to another of the plurality of vertices, wherein a marker situated at a vertex associated with a highest level moves first, followed next by any marker situated at a vertex associated with an intermediate level, and wherein a marker cannot land on a vertex already having a marker on it;

the first marker traversing a first path between the starting vertex for the first indicia and the destination vertex for the first indicia, and the second marker traversing a second path between the starting vertex for the second indicia and the destination vertex for the second indicia, wherein the first and second paths are taken to be a set of paths for solving the object tracking problem.

12. The method of claim 11 further comprising locating a set of maximum-weight connecting paths $P_C$ for all pairs of positive constraints of a set of multiple positive constraints, wherein the set of maximum-weight connecting paths $P_C$ comprises a plurality of vertices each associated with one or more incident edges.

13. The method of claim 12 further comprising deleting all vertices and incident edges in the set of maximum-weight connecting paths $P_C$ to form a remaining graph.

14. The method of claim 13 further comprising solving an unconstrained maximum-weight bipartite matching problem for the remaining graph to provide a set of paths P'.

15. The method of claim 14 further comprising determining $\{P_C, P'\}$ as an approximate solution to the tracking problem.

16. A computer-implemented method for solving an object tracking problem with a single negative constraint using a recursive search algorithm, the method comprising:

gathering, with one or more cameras, a sequence of image frames of one or more objects from a scene;

processing, with one or more processors, the gathered sequence of image frames to construct a directed acyclic graph that includes a plurality of vertices;

defining an original bound associated with a first weight;

identifying a pair of vertices from the directed acyclic graph that are associated with the single negative constraint;

solving, with the one or more processors, an unconstrained problem for the directed acyclic graph to generate an unconstrained solution by ignoring the pair of vertices associated with the single negative constraint, the unconstrained solution providing the first weight;

when the first weight is greater than the original bound, determining whether or not the unconstrained solution is valid; and when the unconstrained solution is valid, taking the unconstrained solution as a solution for the object tracking problem.

17. The method of claim 16 wherein, when the unconstrained solution is not valid, a first vertex is taken as a singleton path, the first vertex including one or more outgoing edges.

18. The method of claim 17 further comprising creating a remaining graph by removing all outgoing edges of the one or more outgoing edges from the first vertex, and solving an unconstrained maximum weight path cover problem for the remaining graph to provide a solution to the tracking problem.

19. A computer-implemented method for solving an object tracking problem with a single negative constraint using a trellis graph, the method comprising:

gathering, with one or more cameras, a sequence of image frames of one or more objects from a scene;

processing, with one or more processors, the gathered sequence of image frames to construct the trellis graph as a union of subgraphs from a plurality of temporally related subgraph stages;

obtaining an unconstrained maximum weight bipartite matching by applying each respective weight of a first set of weights to a corresponding subgraph in the union of subgraphs;

formulating an optimal unconstrained path cover from the bipartite matching, wherein the unconstrained path cover includes a pair of vertices from the trellis graph that are associated with the single negative constraint; and when the single negative constraint is satisfied, taking the unconstrained path cover as a solution for the object tracking problem.

20. The method of claim 19 wherein, in response to the single negative constraint not being satisfied, and in response to a connecting path existing between the pair of vertices associated with the single negative constraint, defining an arc in the connecting path that is within the union of subgraphs.

21. The method of claim 20 further comprising, for each subgraph in the union of subgraphs, preparing a set-theoretic difference graph that includes a set of elements that are in the subgraph but not in the arc.

22. The method of claim 21 further comprising, for each subgraph in the union of subgraphs, obtaining an unconstrained maximum weight bipartite matching for the set-theoretic difference graph by applying each respective weight from a second set of weights to a corresponding subgraph in the union of subgraphs.

23. The method of claim 22 further comprising determining a set of weight drops corresponding to each subgraph of the union of subgraphs by subtracting each respective weight in the second set of weights from a corresponding weight in the first set of weights, and identifying a lowest weight drop from the set of weight drops.

24. The method of claim 23 further comprising determining a solution to the tracking problem by formulating a path cover that both satisfies the negative constraint and achieves maximum weight.

* * * * *